(12) United States Patent
Dollase et al.

(10) Patent No.: US 7,605,212 B2
(45) Date of Patent: Oct. 20, 2009

(54) METHOD FOR PRODUCING CONTACT ADHESIVE MASSES CONTAINING ACRYLIC

(75) Inventors: Thilo Dollase, Hamburg (DE); Matthias Koop, Norderstedt (DE)

(73) Assignee: tesa SE, Hamburg (DE)

( * ) Notice: Subject to any disclaimer, the term of this patent is extended or adjusted under 35 U.S.C. 154(b) by 372 days.

(21) Appl. No.: 11/573,600

(22) PCT Filed: Sep. 9, 2005

(86) PCT No.: PCT/EP2005/054505

§ 371 (c)(1),
(2), (4) Date: May 3, 2007

(87) PCT Pub. No.: WO2006/027386

PCT Pub. Date: Mar. 16, 2006

(65) Prior Publication Data

US 2007/0282064 A1    Dec. 6, 2007

(30) Foreign Application Priority Data

Sep. 9, 2004  (DE) .................... 10 2004 044 084
Sep. 9, 2004  (DE) .................... 10 2004 044 087

(51) Int. Cl.
C08G 18/67  (2006.01)
(52) U.S. Cl. ................... 525/191; 525/185; 526/931
(58) Field of Classification Search ............... 525/191, 525/185; 526/931
See application file for complete search history.

(56) References Cited

U.S. PATENT DOCUMENTS

| | | | |
|---|---|---|---|
| 4,181,752 A | 1/1980 | Martens et al. | |
| 4,465,813 A | 8/1984 | Sattelmeyer et al. | |
| 5,084,348 A | 1/1992 | Czech et al. | |
| 5,128,386 A | 7/1992 | Rehmer et al. | |
| 5,391,406 A | 2/1995 | Ramharack et al. | |
| 5,391,631 A | 2/1995 | Porsch et al. | |
| 6,001,931 A | 12/1999 | Brahm et al. | |
| 6,663,958 B2 | 12/2003 | Husemann et al. | |
| 6,765,078 B2 | 7/2004 | Husemann et al. | |
| 6,835,420 B1 | 12/2004 | Rockrath et al. | |
| 7,084,185 B2 | 8/2006 | Husemann et al. | |
| 2004/0234753 A1 | 11/2004 | Husemann et al. | |
| 2005/0187346 A1 | 8/2005 | Husemann et al. | |
| 2006/0222803 A1 | 10/2006 | Husemann et al. | |

FOREIGN PATENT DOCUMENTS

| | | | |
|---|---|---|---|
| DE | 30 32 707 | | 5/1982 |
| DE | 39 01 690 | | 3/1990 |
| DE | 41 27 513 | | 2/1993 |
| DE | 42 20 807 | | 1/1994 |
| DE | 43 24 801 | | 1/1995 |
| DE | 44 32 368 | | 3/1996 |
| DE | 4432368 | A1 * | 3/1996 |
| DE | 195 242 50 | | 1/1997 |
| DE | 199 38 759 | | 2/2001 |
| DE | 100 29 554 | | 1/2002 |
| DE | 100 30 217 | | 1/2002 |
| DE | 101 29 611 | | 1/2003 |
| DE | 101 57 695 | | 6/2003 |
| DE | 103 10 722 | | 9/2004 |
| DE | 103 12 031 | | 9/2004 |
| DE | 103 59 973 | | 7/2005 |
| EP | 0 377 199 | | 7/1990 |
| EP | 09 96 652 | | 1/1999 |
| WO | WO 93/09152 | | 5/1993 |

OTHER PUBLICATIONS

Handbook of Pressure Sensitive Adhesives Technology, 2nd ed., 1989, van Nostrand, New York.
D. Philp, J.F. Stoddard, Angew. Chem., 1996, 108, 1242.
C. Schmuck, W. Wienand, Angew. Chem., 2001, 113, 4493.
M. Rehahn, Acta Polym., 1998, 49, 201.
B.G.G. Lohmeijer, U.S. Schubert, J. Polym. Sci. A Polym. Chem., 2003, 41, 1413.
Synth. Commun., 1988, 18, 1531.

* cited by examiner

Primary Examiner—Kelechi C Egwim
(74) Attorney, Agent, or Firm—Norris McLaughlin & Marcus PA

(57) ABSTRACT

Method for producing contact adhesive masses containing acrylic, by coupling at least one component to at least one other reactive constituent contained in at least one other component, the at least one reactive constituent having at least two functional groups and the at least one constituent in the at least one other component containing at least two functional groups.

40 Claims, 4 Drawing Sheets

"lock"  "key"

= $-R^6 R^{55} R^{666} C - X^6$

= metal (elemental, metal salt or metal complex)

METHOD FOR PRODUCING CONTACT ADHESIVE MASSES CONTAINING ACRYLIC

This is a 371 of PCT/EP2005/054505 filed 9 Sep. 2005 (international filing date).

The invention relates to a process for producing acrylic pressure-sensitive adhesives. It relates, furthermore, to pressure-sensitive adhesives produced by means of the process, and also to the use of pressure-sensitive adhesives of this kind.

BACKGROUND OF THE INVENTION

In the train of increased environmental awareness and of the effort to produce products in an ever more efficient way, solventless coating operations are becoming more and more established within the pressure-sensitive adhesives (PSAs) segment.

A solventless coating operation, however, imposes exacting requirements on the PSAs to be processed, since their viscoelastic properties govern not only the processability but also their later profile of properties. There are often contradictions between the requirements imposed on the viscoelasticity of the PSA that are favorable for processing and for the product properties. For example, products with a high shear strength frequently comprise polymers having high degrees of polymerization. This, however, leads to high melt viscosities and hence to more complicated and expensive solventless processability.

A PSA applied by solventless coating frequently acquires its ultimate structure only after a crosslinking step, which sets the balance between adhesive and cohesive properties in the product. By way of example, mention may be made here of chemical crosslinking operations, such as the vulcanization of rubbers, for example, of radiation crosslinking operations, such as the UV treatment of polyacrylates, for example, and of physical crosslinking operations, such as the thermoreversible formation of high-softening-point domains in synthetic rubber-based systems.

Polyacrylates-based PSAs are one of the most important basic types of adhesives in self-adhesive tapes, being employed in particular in challenging and high-value applications. Qualities that are utilized with these products are the high weathering and UV stability and also the accessibility of embodiments having a water-clear transparency, in conjunction with an eminently settable balance between bond strength and thermal shear strength. Furthermore, there is a wide range of monomers for constructing the PSAs, leading to further property control possibilities. PSAs based on polyacrylates are also not immune from the trend toward solventlessly coatable systems.

Examples of solventlessly coatable polyacrylates used as PSAs can be found in the literature. A distinction is made here between two concepts: the use of polymers having an initially low degree of polymerization, which following the coating operation are crosslinked by exposure to actinic radiation; and the use of what are called acrylate hotmelts, consisting of polymers with a high melt viscosity at room temperature. Systems belonging to the first group are very amenable to coating, but the cohesive properties of the product, as manifested, for example, in the thermal shear strength, are often capable of improvement. Examples are disclosed in EP 377 199 by BASF and U.S. Pat. No. 4,181,752 by 3M. Approaches belonging to the second group are described for example in U.S. Pat. No. 5,391,406 from National Starch, WO 93/09152 by Avery Dennison or DE 195 242 50 by Beiersdorf. Although good product properties are found for the systems they describe, the solventless coating of these PSAs is often difficult.

DE 100 29 554 describes a process for producing crosslinkable acrylate PSAs with molar masses of more than 200 000 g/mol. In a first step it prepares polyacrylates from a monomer mixture which in one embodiment may comprise acrylic and methacrylic acid monomers and one or more carboxylic anhydrides having olefinic double bonds. In a second step the resultant polyacrylate composition is admixed with further monomers, which possess at least two functional groups. The first functional group is intended to react with the carboxylic anhydride, while the second functional group is a crosslinkable group. Examples of monomers of this kind are acrylates containing hydroxyl groups. The PSAs obtained can subsequently be blended with crosslinkers. Suitable crosslinkers are difunctional or polyfunctional acrylates, difunctional or polyfunctional isocyanates or difunctional or polyfunctional epoxides. The acrylate PSAs are intended for processing from the melt.

DE 100 30 217 likewise discloses a polyacrylate PSA which comprises polymers with molar masses of more than 250 000 g/mol and can be blended with a crosslinker, such as with a difunctional or polyfunctional acrylate, difunctional or polyfunctional isocyanate or difunctional or polyfunctional epoxide, for example. The polyacrylate PSA is applied from a solution to the backing material.

DE 41 27 513 discloses binder mixtures for coating materials which consist of a polyisocyanate component and a hydroxy-functionalized polyacrylate component. The two components are mixed with one another in a solvent and the mixture is applied to a backing material. DE 42 20 807 likewise describes the addition of crosslinkers to a vinyl polymer in a solvent.

DE 43 24 801 discloses a process for producing a coating material. To a first, polymeric component it adds a second component, which can comprise a crosslinker. The first component may constitute (meth)acrylic copolymers containing OH groups, while polyisocyanates are among the proposed second-component candidates. The addition of the second component to the first component is said to be possible without solvent provided the components have a low viscosity. The systems described, however, are unsuitable for PSA utility. Molar masses of the polymers described are situated at not more than 8600 g/mol.

DE 103 59 973 describes a process for producing PSAs which are based on acrylate block copolymers. The acrylate block copolymer is obtained by linking two chemically different acrylate polymer blocks. DE 101 57 695 discloses a process for preparing polymers by linking two components. The first component is a poly(meth)acrylate having a number-average molecular weight of 2000 to 100 000 g/mol, with functional groups formed on its ends. The second component likewise has functional groups at its ends. Linking of the two components takes place by the functional groups located at the ends of the components. For the preparation of the first component, special measures are needed in order to realize the end-functionalization.

None of these citations, accordingly, discloses a process by which easily accessible components can be reacted solventlessly from the melt.

There is therefore a need for a PSA system, and a coating operation for this PSA system, to be provided, so that the appropriate twinning of PSA system and coating operation resolves the disadvantages of the prior art, namely the improvable combination of good solventless-coating properties and good product properties, particularly in respect of thermal shear strength.

SUMMARY OF THE INVENTION

It is an object of the invention to specify a process for producing acrylic PSAs which in self-adhesive products lead to good pressure-sensitive adhesion properties, fulfilling, in particular, the Dahlquist criterion, and achieving a good balance between adhesion and cohesion, while at the same time having good solventless processability and coatability. The invention provides, furthermore, PSAs which are obtained by this process, and their use in self-adhesive products.

The invention consists, accordingly, in an acrylic pressure-sensitive adhesive system and, respectively, in a process for producing a pressure-sensitive adhesive which is constructed by coupling at least one reactive constituent present in at least one component with at least one further reactive constituent present in at least one further component, the at least one reactive constituent in the at least one component containing at least two functional groups, and the at least one constituent in the at least one further component containing at least two functional groups;

at least one reactive constituent of at least one component employed being a functionalized acrylate copolymer which has a weight average of its molar mass distribution between 5000 g/mol and 200 000 g/mol, preferably between 10 000 g/mol and 100 000 g/mol, the acrylate copolymer being a copolymer constructed from at least one nonfunctionalized kind of monomer and at least one functionalized kind of monomer, the at least two functional groups being introduced in the form of the copolymerized functionalized kind of monomer; and the components for preparing the pressure-sensitive adhesive being processed solventlessly.

DETAILED DESCRIPTION

The functionalized monomer component is distributed throughout the acrylate copolymer, i.e., randomly, for example. However, gradients in the frequency of incorporation of the functionalized monomers along the chains are also advantageous and in accordance with the invention. Consequently the functional groups of this component which are needed for coupling the component to the second component are not located, or at least not exclusively located, at the end of the acrylate copolymer. Instead, the functional groups are present along the chain of the acrylate copolymer. The coupling of the two components takes place not—or at least not exclusively—via groups located at the end of the acrylate copolymer. This allows PSAs to be produced more easily than in the prior art.

For the purposes of this invention the term "copolymer" always refers to a polymer or polymer block which is constructed from at least two kinds of comonomers. Within this copolymer or copolymer block, the comonomer composition may be random or may change along the chain.

By way of the process of the invention, PSAs are accessible which fulfill the Dahlquist criterion and achieve a good balance between adhesion and cohesion, while at the same time the mix of components for preparing the PSAs have good solventless processability and coatability, on account in particular of a low melt viscosity in the state of the material to be processed.

As a solution to this technical problem, the approach described here utilizes the concept of processing material which attains its ultimate structure only after the coating operation. The objective acrylate-containing PSA of the invention is produced by mixing at least two components, each containing at least one constituent able to react with at least one constituent of the other component during processing. In one version of this invention the coating operation follows the beginning of the mixing of the components so rapidly that, despite ensuing reaction between the reactive constituents, the mixture retains good processing qualities. During the coating operation and/or subsequently, on a web for example, the reactive constituents in this multicomponent mixture react to form a PSA having good adhesive qualities. The resulting PSA, preferably solventlessly coated, typically has a construction such that in its ultimate state it is uncoatable or has only limited coatability. Also part of this invention are self-adhesive products which are based on the PSAs of the invention and produced by way of the solventless coating operation of the invention.

BRIEF DISCUSSION OF THE DRAWINGS

The invention is elucidated at greater length below with reference to the drawings, in which FIG. 1 shows diagrammatic representations of the coupling of two components by means of hydrogen bonds;

Figure 1:
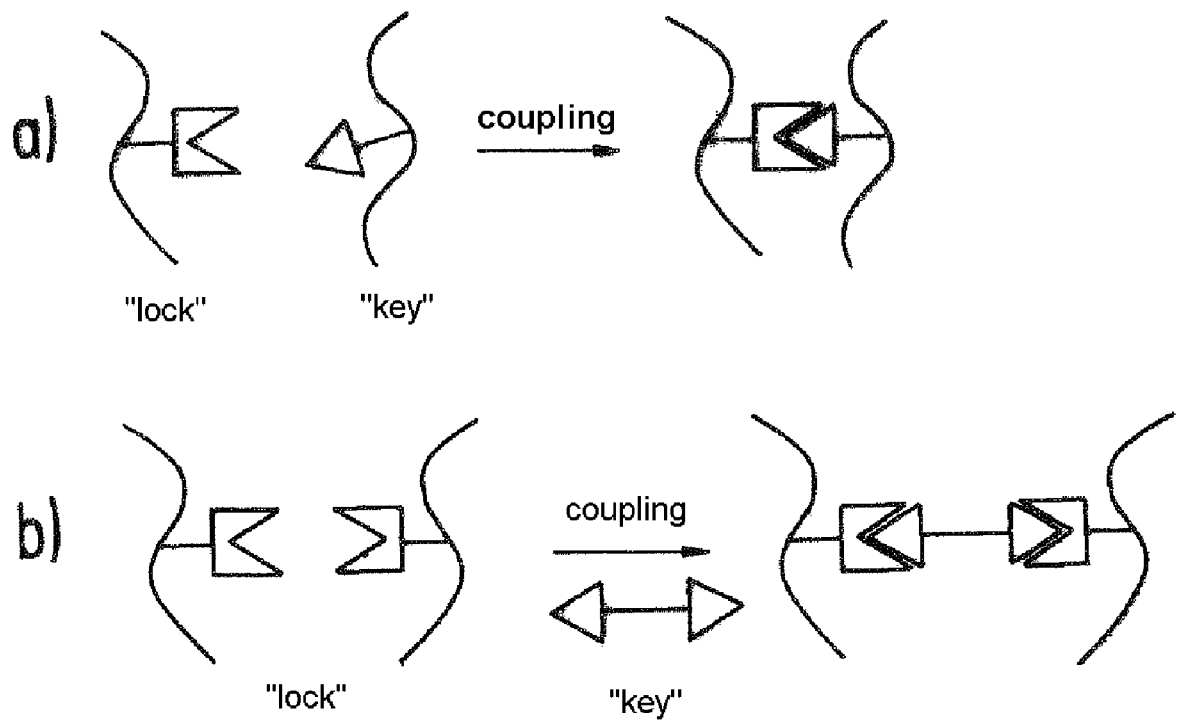

Part of this invention is the production and composition of a solventlessly coatable, acrylate-containing PSA, its coating operation, and self-adhesive products which comprise at least one of the PSAs of the invention and which are obtained by the preferably solventless coating operation of the invention.

It has surprisingly been found that, by way of the inventive concept, based on a multi-component approach, it is possible to produce, and apply by coating, preferably solventlessly coatable, acrylate-containing PSAs. At a time before the coating operation the various individual components are mixed. Preferably during that mixing operation, the coupling of reactive constituents which are present in the various components begins. The time of the mixing of the components and hence also the beginning of the coupling reaction are selected such that the mixture remains readily processable and coatable. At least one component comprises at least one polymer of low molar mass, which is equipped with functional groups and is referred to below as a prepolymer. The reaction with at least one species from at least one further component, that takes place during the coating operation, leads to an increase in the molar mass of the at least one prepolymer, with chain extension and/or crosslinking taking place. At least one component comprises as at least one constituent a prepolymer based on a polyacrylate.

The viscosity of the mixture of the individual components at the beginning of the reaction is set, through the composition of the individual components and the processing temperature, such that the mixture can be coated, preferably solventlessly, onto, say, a continuous web or a lay-on roll. The type of web depends on the desired construction of the resulting self-adhesive product. Prior to the coated web being rolled up there may be further operating steps installed, such as a treatment with radiation and/or heat, for example. Depending on the product's construction, moreover, it is possible for any desired backings, coats or films to be laminated to the coated web, thereby allowing a diversity of self-adhesive products to be produced inventively. Where coating takes place onto a lay-on roll, the coated film can likewise be laminated to any desired backings, coats or films, thereby allowing a diversity of self-adhesive products to be produced inventively.

In order to illustrate the combination of good coating properties and good product properties for the materials of the invention, experimental data available include the melt viscosity of the individual components to be processed, and the plateau modulus of the processed PSA. In the case of components comprising polymeric constituents, one of the factors governing the melt viscosity is the chain length of the polymers. An important control parameter affecting the processability and coatability when producing the PSAs of the invention is the molar mass of the polymers. Low viscosities often correlate with good processability. Short polymers therefore appear predestined for use as melt-processable materials. The adhesive qualities of a pressure-sensitive adhesive are heavily dependent on, among other factors, the degree of crosslinking of the system, which can be estimated via the plateau modulus. According to Dahlquist, the plateau modulus for good PSAs lies between 50 kPa and 200 kPa [D. Satas (ed.), Handbook of Pressure Sensitive Adhesives Technology, 2nd ed., 1989, van Nostrand, New York]. From this requirement it is evident that the PSA must not be too greatly crosslinked. If, however, this PSA is constructed from readily coatable—and hence short—polymers, an upper limit is placed on the distance between two nodes, in the case of chain-end crosslinking, by the end-to-end distance of the polymer chains in the case of statistical crosslinking at distances smaller than the end-to-end distance of the polymer chains.

The present invention discloses a concept and exemplary realization possibilities thereof for the construction, the production, and the coating of innovative pressure-sensitive adhesives. The inventive concept represents a new possibility allowing a combination of good processability and good product properties to be achieved. Pressure-sensitive adhesives of the invention constitute at least one functionalized kind of polymer with an average molar mass so that an acceptable melt viscosity and a crosslinking state that is advantageous for the product properties are achieved.

Production and Composition of Inventive Pressure-Sensitive Adhesives

The pressure-sensitive adhesives of the invention are composed of at least two components, which at the beginning of the operation are spatially separate, i.e., present in different reservoir vessels, for example. These at least two components may be termed A component and B component. At a time prior to coating, which is defined with greater precision below, these at least two components are mixed. The A component comprises at least one constituent equipped so that it can react with at least one constituent of the B component. A preferred version of this invention is the use of two components, from which the PSA of the invention is produced. Likewise in accordance with the invention are mixtures which are produced from more than two components.

At least one of the components employed comprises at least one prepolymer based on a polyacrylate.

In one particularly preferred version the A component comprises all of the constituents which can react with the at least one constituent of the B component but which cannot react with one another within the A component under storage conditions, which are defined below. In this particularly preferred version the B component comprises all of the constituents which can react with at least one constituent of the A component but are unable to react within the B component under storage conditions which are defined below.

It is further possible and in accordance with the invention to add to the mixture further constituents which are unable to react with any of the constituents of the A or B component during processing. This may be done, for example, by mixing with at least one further component. These constituents of the A and/or B component that are not reactive under the storage conditions defined below are preferably added in order to optimize the viscosity and/or the mixing characteristics of the A and/or B component between the reactive constituents of the A and the B components, and/or for purposive adjustment of the product properties.

Where constituents are used which can enter into secondary reactions under particular conditions, such as, for example, a sunlight-induced reaction or a reaction with atmospheric humidity or oxygen, the reservoir vessels are designed such that such external influences are excluded so that they do not occur deleteriously to the intended purpose. The terms "reactivity" and "reactive" in the sense of this invention always refer to the potential of a functionalized constituent present in a given component to react with a constituent which is equipped appropriately for a favorable course of the reaction and is present in at least one other component. By "not reactive" or "inert", in contrast, is meant, in the sense of this invention, that the melt viscosity of a component in the reservoir vessel does not change by more than 20% of the "fresh" value over a period of one day, preferably of one week, more preferably of one month. Storage of the components takes place at up to 60° C., preferably up to 35° C.

Where further reagents, such as catalysts, initiators, coupling reagents or crosslinkers, for example, are needed for the desired coupling reaction between the at least in each case one reactive constituent comprising the at least two components, those reagents are then constituents of a component which either contains no further constituents or contains only further constituents to which these reagents are inert.

Composition of A Component

The A component is composed of at least one constituent which is functionalized such that it is able to react with at least one constituent in the at least one further component, preferably the B component. The A component may further comprise one or more constituents which behave chemically inertly, i.e., are not reactive, toward all of the constituents in all further components. The nature of the functionalization depends on the choice of the at least one co-reactant in the at least one further component. The at least one constituent is considered to be functionalized for the purposes of this invention if it carries at least two groups of one type or of different types distinguished by reactivity toward the at least one constituent in the at least one further component. The thus-functionalized at least one constituent of the A component can, accordingly, be difunctionalized or multifunctionalized. Monofunctionalized or nonfunctionalized constituents do not contribute to the construction of the network that forms in the course of processing. In selecting the reactive constituents, attention must therefore be paid to the degree of functionalization. A functionalized constituent of the A component contains more than 80%, preferably more than 90%, of molecules equipped at least with two functionalizations. This does not rule out, however, the deliberate addition to the A component of nonreactive constituents, particularly constituents different in chemical nature, in fractions of up to 80%.

If the at least one functionalized constituent is a polymer, then its molar mass is between 5000 g/mol and 200 000 g/mol, preferably between 10 000 g/mol and 100 000 g/mol. The molar mass in this context is the weight average of the molar mass distribution, as is obtainable, for example, via gel permeation chromatography analyses. The polydispersity of the systems thus defined, given by the ratio of weight-average to number-average molar mass distribution, is below 8, preferably below 5. A constituent which satisfies this description is referred to below as a prepolymer. A prepolymer has a softening temperature of less than 200° C., preferably less than 100° C., very preferably less than 20° C. By softening temperature in this context is meant the dynamic glass transition temperature, for amorphous systems, and the melting temperature, for semicrystalline systems, each of these temperatures being determinable by means of dynamo-mechanical analysis (DMA) at low frequencies (see Test Methods, Test D). The appropriate temperature in the DMA for this purpose is the temperature at which the loss angle curve exhibits a maximum.

A linear prepolymer may be in the form of a homopolymer (type A1), prepared from at least one nonfunctionalized kind of monomer; a random copolymer (type A2), prepared from at least one nonfunctionalized kind of monomer and at least one functionalized kind of monomer; or a block copolymer (type A3 or type A4), the block copolymer possibly being constructed from at least two different homopolymer blocks (type A3), each prepared from at least one nonfunctionalized kind of monomer, or from at least one block consisting of at least one random copolymer block, prepared from at least one nonfunctionalized kind of monomer and at least one functionalized kind of monomer, and, optionally, from one or more homopolymer blocks (type A4). Prepolymers of type A1 are functionalized in at least two locations along the chain: e.g., chain end 1, chain end 2, in the region of the middle point of the chain. Prepolymers of type A2 offer more possibilities of carrying at least two functionalizations: e.g., chain end 1, chain end 2, in the region of the middle point of the chain, through use of a desired fraction of at least one comonomer which carries the functionalization, at any desired number of points distributed randomly along the chain. Any combination of these functionalization points is also inventive. Prepolymers of type A3 are functionalized in at least two points along the chain: e.g., chain end 1, chain end 2, in the region of the middle point of the chain, optionally one or more of the block linkage points, depending on the number of blocks. Prepolymers of type A4 offer more possibilities of carrying at least two functionalizations: e.g., chain end 1, chain end 2, in the region of the middle point of the chain, optionally one or more of the block linkage points, depending on the number of blocks, through use of a desired fraction of at least one comonomer which carries the functionalization at any desired number of points distributed randomly along those blocks having a copolymer block construction. Any combination of these functionalization points is also in accordance with the invention.

Besides a linear structure, the prepolymer may also be branched, star shaped or grafted in structure. These prepolymers too may be constructed as type A1, type A2, type A3, and type A4. For the possibilities of carrying the at least two functionalizations, the number of possibilities of chain-end functionalization is increased in accordance with the number of chain arms in a star-shaped or grafted system or in accordance with the degree of branching in branched polymers, in addition to the points given as examples above. Systems of such configuration may, for instance, also be functionalized at branching points, arm linkage points or grafting points. The different polymer arms in star-shaped and grafted systems may differ in their chemical nature—that is, they may consist of different monomers and/or may have different comonomer compositions.

As prepolymers of type A1 it is possible to employ all linear, star-shaped, branched, and grafted homopolymers which correspond to the aforementioned definitions concerning the molar mass and softening temperature.

Examples, though without wishing to undertake any restriction, that may be mentioned as advantageous for the purposes of this invention include the following systems: polyethers, such as polyethylene glycol, polypropylene glycol or polytetrahydrofuran, polydienes, such as polybutadiene or polyisoprenes, hydrogenated polydienes, such as polyethylenebutylene or polyethylenepropylene, polyesters, such as polyethylene terephthalate, polybutanediol adipate or polyhexanediol adipate, polycarbonate, polycaprolactone, polymers of vinylaromatic monomers, such as polystyrene or poly-α-methylstyrene, polyalkyl vinyl ethers, polyvinyl acetate, polymers of nonfunctionalized α,β-unsaturated esters.

Examples, but without wishing to undertake any restriction, that may be mentioned as advantageous for the purposes of this invention are random copolymers based on α,β-unsaturated esters and random copolymers based on alkyl vinyl ethers.

Monomers which can be used with advantage for prepolymers of type A1 are in principle all of the compounds familiar to the skilled worker that are suitable for polymer synthesis. Preference is given to using α,β-unsaturated alkyl esters of the general structure $$CH_2=CH(R^1)(COOR^2) \tag{I}$$

where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type A1 encompass acrylic and methacrylic esters with alkyl groups consisting of 1 to 30 C atoms, in particular consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type A1 are acrylic and methacrylic esters containing aromatic radicals, such as phenyl acrylate, benzyl acrylate, phenyl methacrylate or benzyl methacrylate.

In addition it is possible optionally to use vinyl monomers from the following groups: vinyl esters, vinyl ethers, vinyl halides, vinylidene halides, and vinyl compounds containing aromatic rings and heterocycles in α position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, α-methylstyrene.

Besides linear systems, those configured as three-armed, four-armed or multiarmed star polymer are also preferred representatives of the prepolymers of type A1.

The configuration of the at least two functionalizations present in the prepolymers of type A1 is such that they are reactive toward at least one constituent in the at least one further component. Examples of functional groups are described in the section headed "Combinations of functional segments".

As prepolymers of type A2 it is possible to employ all linear, star-shaped, branched or grafted random copolymers which correspond to the aforementioned definitions concerning the molar mass and softening temperature. Prepolymers of type A2 are prepared from at least one nonfunctionalized kind of monomer and at least one functionalized kind of monomer.

Examples, but without wishing to undertake any restriction, that may be mentioned as advantageous for the purposes of this invention are random copolymers starting from nonfunctionalized α,β-unsaturated esters and random copolymers starting from nonfunctionalized alkyl vinyl ethers.

Monomers which can be used with advantage for prepolymers of type A2 are in principle all of the compounds familiar to the skilled worker that are suitable for polymer synthesis. Preference is given to using α,β-unsaturated alkyl esters of the general structure

$$CH_2=CH(R^1)(COOR^2) \quad (I)$$

where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type A2 encompass acrylic and methacrylic esters with alkyl groups consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type A2 are acrylic and methacrylic esters containing aromatic radicals, such as phenyl acrylate, benzyl acrylate, benzoin acrylate, phenyl methacrylate, benzyl methacrylate or benzoin methacrylate.

In addition it is possible optionally to use vinyl monomers from the following groups: vinyl esters, vinyl ethers, vinyl halides, vinylidene halides, and vinyl compounds containing aromatic rings and heterocycles in α position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, α-methylstyrene.

In one preferred version of this invention, prepolymers of type A2 contain their at least two functionalizations in the form of at least one specific comonomer which has been randomly copolymerized during the polymerization of the prepolymer. In this case the molar fraction of this at least one specific comonomer in respect of the composition of the overall monomer mixture when preparing the overall polymer is up to 20%, preferably up to 10%, very preferably up to 5%. The specific character of this at least one comonomer is apparent in the fact that it is functionalized such that it is reactive toward at least one constituent in the at least one further component. Examples of functional groups are described in the section headed "Combinations of functional segments". Particularly preferred monomers are those based on α,β-unsaturated esters that include this functionalization.

Prepolymers of type A3 are constructed such that individual polymer blocks are linked covalently to one another. Each of the individual blocks meets the definitions given above in respect of softening temperature and molar mass. Block linkage may be in a linear form, but may also be in a star-shaped embodiment or in the form of a graft copolymer variant. At its most simple, the prepolymer of type A3 is a diblock copolymer of block 1-block 2 variety, consisting of a block 1 and a block 2 which differ in respect of the selected starting monomers and may optionally differ in their softening temperature and/or molar mass and/or structure (e.g., linear or branched). Further embodiments of the prepolymers of type A3, without wishing to impose any restriction, are triblock copolymers of block 1'-block 2'-block 3' kind, block copolymers of block 1"-block 2"-block 3"-block 4" kind, and higher block copolymers whose structures continue this series. Triblock copolymers and higher block copolymers are inventive in the sense of the prepolymers of type A3 when all of the blocks linked directly to one another differ in respect of the selected starting monomers and also, optionally, in their molar mass and/or softening temperature and/or structure (e.g., linear or branched). Furthermore, triblock copolymers and higher block copolymers are inventive in the sense of the prepolymers of type A3 if two or more of the blocks not linked directly to one another do not differ from one another in respect of the selected starting monomers and also, optionally, in their molar mass and/or softening temperature and/or structure (e.g., linear or branched). A preferred version of a prepolymer of type A3 is a triblock copolymer of block 1'-block 2'-block 3' kind where block 1' and block 3' are the same in respect of the selected starting monomers, molar mass, softening temperature, and structure.

Examples of blocks present in the prepolymers of type A3 are polyethers, such as polyethylene glycol, polypropylene glycol or polytetrahydrofuran, polydienes, such as polybutadiene or polyisoprenes, hydrogenated polydienes, such as polyethylenebutylene or polyethylenepropylene, polyesters, such as polyethylene terephthalate, polybutanediol adipate or polyhexanediol adipate, polycarbonate, polycaprolactone, polymers of vinylaromatic monomers, such as polystyrene or poly-α-methylstyrene, polyalkyl vinyl ethers, polyvinyl acetate, polymers of nonfunctionalized α,β-unsaturated esters.

Examples, but without wishing to undertake any restriction, that may be mentioned as advantageous for the purposes of this invention are random copolymers based on α,β-unsaturated esters and random copolymers based on alkyl vinyl ethers.

Monomers which can be used with advantage for prepolymers of type A3 are in principle all of the compounds familiar to the skilled worker that are suitable for polymer synthesis. Preference is given to using α,β-unsaturated alkyl esters of the general structure

$$CH_2=CH(R^1)(COOR^2) \quad (I)$$

where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type A3 encompass acrylic and methacrylic esters with alkyl groups consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type A3 are acrylic and methacrylic esters containing aromatic radicals, such as phenyl acrylate, benzyl acrylate, phenyl methacrylate or benzyl methacrylate.

In addition it is possible optionally to use vinyl monomers from the following groups: vinyl esters, vinyl ethers, vinyl halides, vinylidene halides, and vinyl compounds containing aromatic rings and heterocycles in $\alpha$ position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, $\alpha$-methylstyrene.

The configuration of the at least two functionalizations that can be employed in the prepolymers of type A3 is such that they are reactive toward at least one constituent in the at least one further component. Examples of functional groups are described in the section headed "Combinations of functional segments".

Prepolymers of type A4 are constructed such that individual polymer blocks are linked covalently to one another. Each of the individual blocks meets the definitions given above in respect of softening temperature and molar mass. Block linkage may be in a linear form, but may also be in a star-shaped embodiment or in the form of a graft copolymer variant. Prepolymers of type A4 differ from prepolymers of type A3 in that at least one block is constructed as a random copolymer comprising at least two comonomers. At its most simple, the prepolymer of type A4 is a diblock copolymer of block 1'''-block 2''' variety, consisting of a block 1''' and a block 2''' which differ in respect of the comonomer composition and may optionally differ in their molar mass and/or softening temperature and/or structure (e.g., linear or branched). Further embodiments of the prepolymers of type A4, without wishing to impose any restriction, are triblock copolymers of block 1''''-block 2''''-block 3'''' kind, block copolymers of block 1'''''-block 2'''''-block 3'''''-block 4''''' kind, and higher block copolymers whose structures continue this series. Triblock copolymers and higher block copolymers are inventive in the sense of the prepolymers of type A4 when all of the blocks linked directly to one another differ in respect of the comonomer composition and/or the choice of the starting monomers and also, optionally, in their molar mass and/or softening temperature and/or structure (e.g., linear or branched). Furthermore, triblock copolymers and higher block copolymers are inventive in the sense of the prepolymers of type A4 if two or more of the blocks not linked directly to one another do not differ from one another in respect of the comonomer composition and/or the choice of the starting monomers and also, optionally, in their molar mass and/or softening temperature and/or structure (e.g., linear or branched). A preferred version of a prepolymer of type A4 is a triblock copolymer of block 1''''-block 2''''-block 3'''' kind where block 1'''' and block 3'''' are the same in respect of the selected starting monomers, molar mass, softening temperature, and structure.

For the choice of the starting monomers of the individual blocks occurring in the inventive prepolymers of type A4 it is possible, without wishing to impose any restriction as a result of this enumeration, to employ all those monomers which can also be used as starting monomers for prepolymers of type A2.

Moreover, it is inventive to select, for the construction of the prepolymers of type A4, blocks from the group of the varieties which can be used for the prepolymers of type A3.

In one preferred version of this invention, prepolymers of type A4 contain their at least two functionalizations in the form of at least one specific comonomer which is present randomly distributed in at least one block. In this case the molar fraction of this at least one specific comonomer in respect of the composition of the overall polymer is up to 20%, preferably up to 10%, very preferably up to 5%. The specific character of this at least one comonomer is apparent in the fact that it is functionalized such that it is reactive toward at least one constituent in the at least one further component. Examples of functional groups are described in the section headed "Combinations of functional segments". Particularly preferred monomers are those based on $\alpha,\beta$-unsaturated esters that include this functionalization.

The A component comprises at least one constituent of type A1, type A2, type A3 or type A4. An A component is likewise inventive when it comprises constituents of different types (A1, A2, A3, A4).

It is inventive, moreover, to use optionally nonfunctionalized and/or monofunctionalized polymers and/or nonfunctionalized and/or monofunctionalized block copolymers as constituents in the A component. For the composition of the nonfunctionalized polymers which may be used optionally as a constituent in the A component, the indications that apply are the same as those in terms of construction, composition, selection of monomers, softening temperature, and structure that can be found in the definition of prepolymers of type A1 and type A2. The weight average of their molar mass distribution is less than 1 000 000 g/mol, preferably less than 100 000 g/mol. Their softening temperature is less than 200° C., preferably less than 100° C., more preferably less than 20° C. For monofunctionalized polymers which can be used optionally as constituents in the A component, the indications which apply are those made for nonfunctionalized polymers which can be used optionally as constituents in the A component. Additionally, however, they include a functionalization which is reactive with at least one constituent in the at least one further component.

For the composition of the nonfunctionalized block copolymers which may be used optionally as a constituent in the A component, the indications that apply are the same as those in terms of construction, composition, selection of monomers, softening temperature, and structure that can be found in the definition of prepolymers of type A3 and type A4. The weight average of their molar mass distribution is less than 1 000 000 g/mol, preferably less than 250 000 g/mol. For monofunctionalized block copolymers which can be used optionally as constituents in the A component, the indications which apply are those made for nonfunctionalized block copolymers which can be used optionally as constituents in the A component. Additionally, however, they include a functionalization which is reactive with at least one constituent in the at least one further component.

A monofunctionalized constituent of the A component contains more than 80%, preferably more than 90%, of molecules equipped with a functionalization.

As further constituents the A component may comprise tackifier resins, plasticizers, rheological additives, catalysts, stabilizers, compatibilizers, coupling reagents, antioxidants, further aging inhibitors, light stabilizers, flame retardants, pigments, dyes, fillers and/or expandants. These further constituents which can be used optionally in the A component are notable for the fact that they are not reactive toward all of the other constituents of the A component, under the storage conditions defined above. Where two or more of these constituents which can be used optionally in the A component are employed, they are also not reactive with one another under the storage conditions defined above.

Composition of B Component

The B component is composed of at least one constituent which is functionalized such that it is able to react with at least one constituent in the at least one further component, for example the A component. The B component may further comprise one or more constituents which behave chemically inertly, i.e., are not reactive, toward all of the constituents in all further components. The nature of the functionalization depends on the choice of the at least one co-reactant in the at least one further component. The at least one constituent is considered to be functionalized for the purposes of this invention if it carries at least two groups of one type or of different types distinguished by reactivity toward the at least one constituent in the at least one further component. The thus-functionalized at least one constituent of the B component can, accordingly, be difunctionalized or multifunctionalized. Monofunctionalized or nonfunctionalized constituents do not contribute to the construction of the network that forms in the course of processing. In selecting the reactive constituents, attention must therefore be paid to the degree of functionalization. A functionalized constituent of the B component contains more than 80%, preferably more than 90%, of molecules equipped at least with two functionalizations. This does not rule out, however, the deliberate addition to the B component of nonreactive constituents, particularly constituents different in chemical nature.

If the at least one functionalized constituent is a polymer, then the weight average of its molar mass distribution is less than 300 000 g/mol, preferably less than 100 000 g/mol, very preferably less than 25 000 g/mol. The polydispersity of the systems thus defined, given by the ratio of weight-average to number-average molar mass distribution, is below 8, preferably below 5. A prepolymer of this kind has a softening temperature of less than 200° C., preferably less than 100° C. very preferably less than 20° C.

A linear prepolymer may be in the form of a homopolymer (type B1), prepared from at least one nonfunctionalized kind of monomer; a random copolymer (type B2), prepared from at least one nonfunctionalized kind of monomer and at least one functionalized kind of monomer; or a block copolymer (type B3 or type B4), the block copolymer possibly being constructed from at least two different homopolymer blocks (type B3), each prepared from at least one nonfunctionalized kind of monomer, or from at least one block consisting of at least one random copolymer block, prepared from at least one nonfunctionalized kind of monomer and at least one functionalized kind of monomer, and, optionally, from one or more homopolymer blocks (type B4). Prepolymers of type B1 are functionalized in at least two locations along the chain: e.g., chain end 1, chain end 2, in the region of the middle point of the chain. Prepolymers of type B2 offer more possibilities of carrying at least two functionalizations: e.g., chain end 1, chain end 2, in the region of the middle point of the chain, through use of a desired fraction of at least one comonomer which carries the functionalization, at any desired number of points distributed randomly along the chain. Any combination of these functionalization points is also inventive. Prepolymers of type B3 are functionalized in at least two points along the chain: e.g., chain end 1, chain end 2, in the region of the middle point of the chain, optionally one or more of the block linkage points, depending on the number of blocks. Prepolymers of type B4 offer more possibilities of carrying at least two functionalizations: e.g., chain end 1, chain end 2, in the region of the middle point of the chain, optionally one or more of the block linkage points, depending on the number of blocks, through use of a desired fraction of at least one comonomer which carries the functionalization at any desired number of points distributed randomly along those blocks having a copolymer block construction. Any combination of these functionalization points is also in accordance with the invention.

The prepolymer may be linear, branched, star shaped or grafted in structure. These prepolymers too may be constructed as type B1, type B2, type B3, and type B4. For the possibilities of carrying the at least two functionalizations, the number of possibilities of chain-end functionalization is increased in accordance with the number of chain arms in a star-shaped or grafted system or in accordance with the degree of branching in branched polymers, in addition to the points given as examples above. Systems of such configuration may, for instance, also be functionalized at branching points, arm linkage points or grafting points. The different polymer arms in star-shaped and grafted systems may differ in their chemical nature—that is, they may consist of different monomers and/or may have different comonomer compositions.

Furthermore, the B component may also comprise constituents of type B5. Type B5 encompasses functionalized compounds of low molecular mass.

As prepolymers of type B1 it is possible to employ all linear, star-shaped, branched, and grafted homopolymers which correspond to the aforementioned definitions concerning the molar mass and softening temperature.

Examples, though without wishing to undertake any restriction, that may be mentioned as advantageous for the purposes of this invention include the following systems: polyethers, such as polyethylene glycol, polypropylene glycol or polytetrahydrofuran, polydienes, such as polybutadiene or polyisoprenes, hydrogenated polydienes, such as polyethylenebutylene or polyethylenepropylene, polyesters, such as polyethylene terephthalate, polybutanediol adipate or polyhexanediol adipate, polycarbonate, polycaprolactone, polymers of vinylaromatic monomers, such as polystyrene or poly-α-methylstyrene, polyalkyl vinyl ethers, polyvinyl acetate, polymers of nonfunctionalized α,β-unsaturated esters.

Examples, but without wishing to undertake any restriction, that may be mentioned as advantageous for the purposes of this invention are random copolymers based on α,β-unsaturated esters and random copolymers based on alkyl vinyl ethers.

Monomers which can be used with advantage for prepolymers of type B1 are in principle all of the compounds familiar to the skilled worker that are suitable for polymer synthesis. Preference is given to using α,β-unsaturated alkyl esters of the general structure $$CH_2=CH(R^1)(COOR^2) \quad \quad (I)$$

where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type B1 encompass acrylic and methacrylic esters with alkyl groups consisting of 1 to 30 C atoms, in particular consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type B1 are acrylic and methacrylic esters containing aromatic radicals, such as phenyl acrylate, benzyl acrylate, phenyl methacrylate or benzyl methacrylate.

In addition it is possible optionally to use vinyl monomers from the following groups: vinyl esters, vinyl ethers, vinyl halides, vinylidene halides, and vinyl compounds containing aromatic rings and heterocycles in α position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, α-methylstyrene.

Besides linear systems, those configured as three-armed, four-armed or multiarmed star polymer are also preferred representatives of the prepolymers of type B1.

The configuration of the at least two functionalizations present in the prepolymers of type B1 is such that they are reactive toward at least one constituent in the at least one further component. Examples of functional groups are described in the section headed "Combinations of functional segments".

As prepolymers of type B2 it is possible to employ all linear, star-shaped, branched and grafted random copolymers which correspond to the aforementioned definitions concerning the molar mass and softening temperature. Prepolymers of type B2 are prepared from at least one nonfunctionalized kind of monomer and at least one functionalized kind of monomer.

Examples, but without wishing to undertake any restriction, that may be mentioned as advantageous for the purposes of this invention are random copolymers starting from α,β-unsaturated esters and random copolymers starting from alkyl vinyl ethers.

Monomers which can be used with advantage for prepolymers of type B2 are in principle all of the compounds familiar to the skilled worker that are suitable for polymer synthesis. Preference is given to using α,β-unsaturated alkyl esters of the general structure (I) where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type B2 encompass acrylic and methacrylic esters with alkyl groups consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type B2 are acrylic and methacrylic esters containing aromatic radicals, such as phenyl acrylate, benzyl acrylate, benzoin acrylate, phenyl methacrylate, benzyl methacrylate or benzoin methacrylate.

In addition it is possible optionally to use vinyl monomers from the following groups: vinyl esters, vinyl ethers, vinyl halides, vinylidene halides, and vinyl compounds containing aromatic rings and heterocycles in α position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, α-methylstyrene.

In one preferred version of this invention, prepolymers of type B2 contain their at least two functionalizations in the form of at least one specific comonomer which has been randomly copolymerized during the polymerization of the prepolymer. In this case the molar fraction of this at least one specific comonomer in respect of the composition of the overall monomer mixture when preparing the overall polymer is up to 20%, preferably up to 10%, very preferably up to 5%. The specific character of this at least one comonomer is apparent in the fact that it is functionalized such that it is reactive toward at least one constituent in the at least one further component. Examples of functional groups are described in the section headed "Combinations of functional segments". Particularly preferred monomers are those based on α,β-unsaturated esters that include this functionalization.

Prepolymers of type B3 are constructed such that individual polymer blocks are linked covalently to one another. Each of the individual blocks meets the definitions given above in respect of softening temperature and molar mass. Block linkage may be in a linear form, but may also be in a star-shaped embodiment or in the form of a graft copolymer variant. At its most simple, the prepolymer of type B3 is a diblock copolymer of block 1*-block 2* variety, consisting of a block 1* and a block 2* which differ in respect of the selected starting monomers and may optionally differ in their softening temperature and/or molar mass and/or structure (e.g., linear or branched). Further embodiments of the prepolymers of type B3, without wishing to impose any restriction, are triblock copolymers of block 1-block 2-block 3 kind, block copolymers of block 1*-block 2*-block 3*-block 4* kind, and higher block copolymers whose structures continue this series. Triblock copolymers and higher block copolymers are inventive in the sense of the prepolymers of type B3 when all of the blocks linked directly to one another differ in respect of the selected starting monomers and also, optionally, in their molar mass and/or softening temperature and/or structure (e.g., linear or branched). Furthermore, triblock copolymers and higher block copolymers are inventive in the sense of the prepolymers of type B3 if two or more of the blocks not linked directly to one another do not differ from one another in respect of the selected starting monomers and also, optionally, in their molar mass and/or softening temperature and/or structure (e.g., linear or branched). A preferred version of a prepolymer of type B3 is a triblock copolymer of block 1-block 2-block 3 kind where block 1 and block 3 are the same in respect of the selected starting monomers, molar mass, softening temperature, and structure.

Examples of blocks present in the prepolymers of type B3 are polyethers, such as polyethylene glycol, polypropylene glycol or polytetrahydrofuran, polydienes, such as polybutadiene or polyisoprene, hydrogenated polydienes, such as polyethylenebutylene or polyethylenepropylene, polyesters, such as polyethylene terephthalate, polybutanediol adipate or polyhexanediol adipate, polycarbonate, polycaprolactone, polymers of vinylaromatic monomers, such as polystyrene or poly-α-methylstyrene, polyalkyl vinyl ethers, polyvinyl acetate, polymers of nonfunctionalized α,β-unsaturated esters.

Examples, but without wishing to undertake any restriction, that may be mentioned as advantageous for the purposes of this invention are random copolymers based on α,β-unsaturated esters and random copolymers based on alkyl vinyl ethers.

Monomers which can be used with advantage for prepolymers of type B3 are in principle all of the compounds familiar to the skilled worker that are suitable for polymer synthesis. Preference is given to using α,β-unsaturated alkyl esters of the general structure

$$CH_2=CH(R^1)(COOR^2) \tag{I}$$

where $R^1$=H or $CH_3$ and $R^2$=H or linear, branched or cyclic, saturated or unsaturated alkyl radicals having 1 to 30, in particular having 4 to 18, carbon atoms.

Monomers which are used very preferentially in the sense of the general structure (I) for prepolymers of type B3 encompass acrylic and methacrylic esters with alkyl groups consisting of 4 to 18 C atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, their branched isomers, such as 2-ethylhexyl acrylate and isooctyl acrylate, and also cyclic monomers such as cyclohexyl or norbornyl acrylate and isobornyl acrylate, for example.

Likewise suitable for use as monomers for prepolymers of type B3 are acrylic and methacrylic esters containing aromatic radicals, such as phenyl acrylate, benzyl acrylate, phenyl methacrylate or benzyl methacrylate.

In addition it is possible optionally to use vinyl monomers from the following groups: vinyl esters, vinyl ethers, vinyl halides, vinylidene halides, and vinyl compounds containing aromatic rings and heterocycles in α position. For the vinyl monomers that may optionally be used, mention may be made by way of example of selected monomers that can be employed in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, α-methylstyrene.

Besides linear systems, those with a three-arm, four-arm or multiarm star polymer configuration are also preferred representatives of the prepolymers of type B3.

The configuration of the at least two functionalizations present in the prepolymers of type B3 is such that they are reactive toward at least one constituent in the at least one further component. Examples of functional groups are described in the section headed "Combinations of functional segments".

Prepolymers of type B4 are constructed such that individual polymer blocks are linked covalently to one another. Each of the individual blocks meets the definitions given above in respect of softening temperature and molar mass. Block linkage may be in a linear form, but may also be in a star-shaped embodiment or in the form of a graft copolymer variant. Prepolymers of type B4 differ from prepolymers of type B3 in that at least one block is constructed as a random copolymer comprising at least two comonomers. At its most simple, the prepolymer of type B4 is a diblock copolymer of block 1**-block 2 variety, consisting of a block 1 and a block 2 which differ in respect of the comonomer composition and may optionally differ in their molar mass and/or softening temperature and/or structure (e.g., linear or branched). Further embodiments of the prepolymers of type B3, without wishing to impose any restriction, are triblock copolymers of block 1*-block 2*-block 3* kind, block copolymers of block 1**-block 2**-block 3**-block 4** kind, and higher block copolymers whose structures continue this series. Triblock copolymers and higher block copolymers are inventive in the sense of the prepolymers of type B4 when all of the blocks linked directly to one another differ in respect of the comonomer composition and/or the choice of the starting monomers and also, optionally, in their molar mass and/or softening temperature and/or structure (e.g., linear or branched). Furthermore, triblock copolymers and higher block copolymers are inventive in the sense of the prepolymers of type B4 if two or more of the blocks not linked directly to one another do not differ from one another in respect of the comonomer composition and/or the choice of the starting monomers and also, optionally, in their molar mass and/or softening temperature and/or structure (e.g., linear or branched). A preferred version of a prepolymer of type B3 is a triblock copolymer of block 1*-block 2*-block 3* kind where block 1* and block 3*** are the same in respect of the selected starting monomers, molar mass, softening temperature, and structure.

For the choice of the starting monomers of the individual blocks occurring in the inventive prepolymers of type B4 it is possible, without wishing to impose any restriction as a result of this enumeration, to employ all those monomers which can also be used as starting monomers for prepolymers of type B2.

Moreover, it is inventive to select, for the construction of the prepolymers of type B4, blocks from the group of the varieties which can be used for the prepolymers of type B3.

In one preferred version of this invention, prepolymers of type B4 contain their at least two functionalizations in the form of at least one specific comonomer which is present randomly distributed in at least one block. In this case the molar fraction of this at least one specific comonomer in respect of the composition of the overall polymer is up to 20%, preferably up to 10%, very preferably up to 5%. The specific character of this at least one comonomer is apparent in the fact that it is functionalized such that it is reactive toward at least one constituent in the at least one further component. Examples of functional groups are described in the section headed "Combinations of functional segments".

Advantageously in the sense of this invention, the B component may also, and also exclusively, comprise functionalized compounds of low molecular mass of type B5, particularly when at least one constituent in at least one other component is a functionalized prepolymer. The molar mass of this compound of type B5 is less than 5000 g/mol, preferably less than 2500 g/mol, very preferably less than 1000 g/mol. The degree of functionalization for this compound, in order for it to be inventive, is at least two. The functionalized substance contains more than 80% of these at least two functionalizations, preferably more than 90%.

It is likewise inventive to use a mixture of compounds with different degrees of functionalization, particularly those with difunctionality and trifunctionality, as component B5.

The B component comprises at least one material of type B1, type B2, type B3, type B4, or type B5. A B component is likewise inventive when it comprises materials of different types (B1, B2, B3, B4, B5).

It is inventive, moreover, to use optionally nonfunctionalized and/or monofunctionalized polymers and/or nonfunctionalized and/or monofunctionalized block copolymers as constituents in the B component. For the composition of the nonfunctionalized polymers which may be used optionally as a constituent in the B component, the indications that apply are the same as those in terms of construction, composition, selection of monomers, softening temperature, and structure that can be found in the definition of prepolymers of type B1 and type B2. The weight average of their molar mass distribution is less than 1 000 000 g/mol, preferably less than 100 000 g/mol. Their softening temperature is less than 200° C., preferably less than 100° C., more preferably less than 20° C. For monofunctionalized polymers which can be used optionally as constituents in the B component, the indications which apply are those made for nonfunctionalized polymers which can be used optionally as constituents in the B component. Additionally, however, they include a functionalization which is reactive with at least one constituent in the at least one further component.

For the composition of the nonfunctionalized block copolymers which may be used optionally as a constituent in the B component, the indications that apply are the same as those in terms of construction, composition, selection of monomers, softening temperature, and structure that can be found in the definition of prepolymers of type B3 and type B4. The weight average of their molar mass distribution is less than 1 000 000 g/mol, preferably less than 250 000 g/mol. For monofunctionalized block copolymers which can be used optionally as constituents in the B component, the indications which apply are those made for nonfunctionalized block copolymers which can be used optionally as constituents in the B component. Additionally, however, they include a functionalization which is reactive with at least one constituent in the at least one further component.

A monofunctionalized constituent of the B component contains more than 80%, preferably more than 90%, of molecules equipped with a functionalization.

As further constituents the B component may comprise tackifier resins, plasticizers, rheological additives, catalysts, stabilizers, compatibilizers, coupling reagents, antioxidants, aging inhibitors, light stabilizers, flame retardants, pigments, dyes, fillers and/or expandants. These further constituents which can be used optionally in the B component are notable for the fact that they are not reactive toward all of the other constituents of the B component, under the storage conditions defined above. Where two or more of these constituents which can be used optionally in the B component are employed, they are also not reactive with one another under the storage conditions defined above.

Further Components

Part of this invention is the optional use of one or more further components. As a further component, use may be made of a C component or, optionally, further components. The C component and any further component used optionally may, each considered individually, be composed of one or more constituents. Where one component contains more than one constituent, the constituents in this individual component are distinguished by the fact that, within this component, they are not reactive with one another under the storage conditions defined above. The C component and/or any further component used optionally may comprise one or more constituents which are reactive toward one or more constituents of one or more other components. In this respect the details that apply in terms of construction, composition, choice of monomers, softening temperature, and structure are the same as those to be found in the definition of prepolymers of type A1, type A2, type A3, type A4. The C component and/or any other component used optionally may comprise one or more constituents which are not reactive toward any constituent which is present in all other components.

In one preferred version of this invention the C component or further components, employable optionally, comprise one or more substances which contribute to the taking-place of a coupling reaction between one or more constituents of one or more other components. These may be crosslinkers, initiators, coupling reagents, catalysts or further reactive or reaction-promoting constituents. It is additionally advantageous to disperse these reactive or reaction-promoting substances in one or more constituents which are inert toward these substances and, moreover, are inert toward one or more constituents in one or more further components. The use of inert constituents of this kind is specially preferable when one or more of the reactive or reaction-promoting substances is, in the unmixed state, solid or of such high viscosity that it cannot be pumped, metered and/or conveyed at the operating temperature set.

Advantageously in the sense of this invention, the C component or further components, employable optionally, may also, and also exclusively, comprise functionalized compounds of low molecular mass. The molar mass of this compound is less than 5000 g/mol, preferably less than 2500 g/mol, very preferably less than 1000 g/mol. The degree of functionalization for this compound, in order for it to be inventive, is at least two. The functionalized substance contains more than 80% of at least two functionalizations, preferably more than 90%. Examples of functional groups are described in the section headed "Combinations of functional segments".

It is inventive to use optionally nonfunctionalized and/or monofunctionalized polymers and/or nonfunctionalized and/or monofunctionalized block copolymers as constituents in the C component or further components, employable optionally. For the composition of the nonfunctionalized polymers which may be used optionally as a constituent in the C component or further components, employable optionally, the indications that apply are the same as those that can be found in the definition of prepolymers of type A1, type A2, type B1 and type B2. The weight average of their molar mass distribution is less than 1 000 000 g/mol, preferably less than 100 000 g/mol. Their softening temperature is less than 200° C., preferably less than 100° C., more preferably less than 20° C. For monofunctionalized polymers which can be used optionally as constituents in the C component or further components, employable optionally, the indications which apply are those made for nonfunctionalized polymers which can be used optionally as constituents in the A component and B component. Additionally, however, they include a functionalization which is reactive with at least one constituent in the at least one further component.

For the composition of the nonfunctionalized block copolymers which may be used optionally as a constituent in the C component or further components, employable optionally, the indications that apply are the same as those in terms of construction, composition, selection of monomers, softening temperature, and structure that can be found in the definition of prepolymers of type A3, type A4, type B3 and type B4. The weight average of their molar mass distribution is less than 1 000 000 g/mol, preferably less than 250 000 g/mol. For monofunctionalized block copolymers which can be used optionally as constituents in the C component or further components, employable optionally, the indications which apply are those made for nonfunctionalized block copolymers which can be used optionally as constituents in the A component and B component. Additionally, however, they include a functionalization which is reactive with at least one constituent in the at least one further component.

A monofunctionalized constituent of the C component or further components, employable optionally, contains more than 80%, preferably more than 90%, of molecules equipped with a functionalization.

As further constituents the C component may comprise tackifier resins, plasticizers, rheological additives, stabilizers, compatibilizers, antioxidants, further aging inhibitors, light stabilizers, flame retardants, pigments, dyes, fillers and/or expandants. These further constituents which can be used optionally in the C component or further components, employable optionally, are notable for the fact that they are not reactive toward all of the other constituents which are present apart from them in their component, under the storage conditions defined above. Where two or more of these constituents which can be used optionally in the C component or further components, employable optionally, are employed, they are also not reactive with one another under the storage conditions defined above.

To the schooled reader it is apparent that the notation A, B, C, etc. component is arbitrary. It is equally good, and possible for the purposes of this invention, to select the notation in reverse. The nomenclature "A component", "B component", "C component", etc., that is used is intended to serve merely to distinguish between components whose composition is different. The different components employed in accordance with the invention are therefore commutative.

At least one prepolymer which is employed in at least one component in the process of the invention is a functionalized acrylate copolymer that contains its functional groups distributed along the polymer chain, especially randomly or in the form of a gradient.

Inventive Combinations of Components

Although it is in accordance with the invention to mix as many components as desired at a below-defined time prior to coating, so that preferably coupling between at least one reactive constituent each from at least two different components commences, it is appropriate for practical reasons to limit the number of components to a minimum. Particular preference is therefore given to an operation in which all of the raw materials which are needed for the coupling of individual constituents and for the setting of the desired product properties are distributed over a minimum number of components in such a way as to ensure spatial separation of the inter-reactive constituents prior to processing. In this way, the storage stability of the individual components is rendered good, and the processability of the individual components, a function in particular of their viscosity, is ensured. It is particularly preferred to use two components.

The composition and number of the components which are selected for an operation according to the invention is governed by the proviso that the crude components are readily conveyable and miscible and that the mixture of the components, even when the coupling reaction begins prior to coating, is still readily conveyable and readily coatable. The viscosity of the individual components and also the rate of coupling between reactive constituents and the associated increase in viscosity with time are central, primary requirements for the composition of the starting components of the invention and for the nature of the reactive constituents they comprise. The viscosity of the starting components and also of the mix of components at the beginning of the coupling reaction, and the rate of the coupling reaction of the reactive constituents, are characteristics of the starting materials used. The temperature, in contrast, is an important control variable for setting the conveying and mixing behavior of the starting components and of the mix of components, but also for regulating the rate of the coupling reaction.

Details of the rate of inventive coupling reactions can be found in the section headed "Combinations of functional segments". The temperature regime in the operation of the invention is defined in the section headed "Solvent-free coating operation". Information on viscosities of the starting components and of the mix of components is given below.

Components and mixtures of components that are in accordance with the invention are those which up until the time of coating have a viscosity of less than 10 kPa s, preferably less than 1 kPa s, more preferably less than 0.1 kPa s. These viscosity figures should be understood as zero-shear viscosities at 60° C. (see Test methods, Test B). Optionally at least one component of an inventive component combination has a zero-shear viscosity at 60° C. of more than 1 kPa s.

In addition, requirements in respect of the product properties to be achieved are imposed on the starting components. Central data for the characterization of product properties that are employed here are the softening temperature, the plateau modulus at 25° C. and a frequency of 1 rad/s, and the gel value. In the examples, then, correlations are indicated with data relating to the pressure-sensitive adhesiveness of self-adhesive products of the invention that are produced from the inventive starting components by way of the inventive processing and coating operation.

The composition of the components employed for the purposes of this invention is selected such that preferably during the coating operation a pressure-sensitive adhesive is formed which comprises at least one phase which has a softening temperature (see Test methods, Test D) of between −125° C. and +50° C., preferably between −75° C. and +25° C. Said at least one phase is present in the PSA at least at 25%, preferably at least at 50%, more preferably at least at 75%, by volume. Where further phases are present in the PSA, they have a softening temperature of less than +200° C., preferably less than +100° C., more preferably less than +25° C. Phases for the purposes of this invention are spatially separate domains which differ in the nature of their parent materials or material segments and resultant properties such as the softening temperature, for example. The typical scale of length of such domains is greater than 1 nm.

The composition of the components employed for the purposes of this invention is selected such that in the course of the coating operation a pressure-sensitive adhesive is formed which has a plateau modulus $G_N^0$ at 25° C. and 1 rad/s (see Test methods, Test C) of between 5 kPa and 1000 kPa, preferably between 25 kPa and 400 kPa, more preferably between 50 kPa and 200 kPa.

One measure of quantifying the crosslinked fraction of a material is the gel value (see Test methods, Test E). The composition of the components employed for the purposes of this invention is selected such that during the coating operation a pressure-sensitive adhesive is formed which has a gel value of greater than 25% by weight, preferably greater than 40% by weight.

Combinations of Functional Segments

The PSAs of the invention are produced preferably by the coupling, beginning during processing, of at least one reactive constituent of each of the at least two components that are mixed.

Coupling of at least one reactive constituent of each of the at least two components means, for the purposes of this invention a chemical reaction in which at least one kind of functional segments present in at least one reactive constituent in at least one component reacts with at least one further kind of functional segments present in at least one reactive constituent in at least one further component, and leads to the formation of a covalent bond, the formation of hydrogen bonds between at least one kind of functional segments present in at least one reactive constituent in at least one component and at least one further kind of functional segments present in at least one reactive constituent in at least one further component, the formation of a coordinate bond as a result, for example, of formation of a complex, involving the at least one kind of functional segments present in at least one reactive constituent in at least one component with at least one further kind of functional segments present in at least one reactive constituent in at least one further component, so that at least one donor/acceptor bond is formed.

The coupling in this case may take place between the functional segments directly or else by mediation through a further substance, such as a coupling reagent, for example. The position and number of the functional segments in the inventively employable reactive constituents are subject to the same definitions as were given for the prepolymers of type A1, type A2, type A3, type A4, type B1, type B2, type B3, and type B4 and also for the low molecular mass reactive constituents of type B5.

Where the inventive coupling of the reactive constituents is to proceed as a chemical reaction, the functional segments involved are defined in accordance with the following remarks.

At least one kind of inventive functional segments present in at least one reactive constituent in at least one first component has the general structure $(R^{\circ}R^{\circ\circ}R^{\circ\circ\circ}C)—X$. $R^{\circ}$, $R^{\circ\circ}$ and $R^{\circ\circ\circ}$ may independently of one another be saturated or unsaturated, aliphatic or aromatic hydrocarbon radicals which may also be linked to one another and may be identical or different. The radicals $R^{\circ}$, $R^{\circ\circ}$, and $R^{\circ\circ\circ}$ may independently of one another include any desired number of heteroatoms. The radicals $R^{\circ}$, $R^{\circ\circ}$, and $R^{\circ\circ\circ}$ may be of low molecular mass or may be polymeric in nature. Up to two of the radicals $R^{\circ}$, $R^{\circ\circ}$, and $R^{\circ\circ\circ}$ may also be hydrogen atoms, furthermore. The group needed for the coupling reaction is designated X.

The at least one inventive segment of the structure $(R^{\circ}R^{\circ\circ}R^{\circ\circ\circ}C)—X$ is reactive toward at least one functional segment which is present in at least one reactive constituent in at least one optionally second component and which has the general structure $(R^{+}R^{++}R^{+++}C)—Y$. $R^{+}$, $R^{++}$ and $R^{+++}$ may independently of one another be saturated or unsaturated, aliphatic or aromatic hydrocarbon radicals which may also be linked to one another and may be identical or different. The radicals $R^{+}$, $R^{++}$ and $R^{+++}$ may independently of one another include any desired number of heteroatoms. The radicals $R^{+}$, $R^{++}$ and $R^{+++}$ may be of low molecular mass or polymeric in nature. Up to two of the radicals $R^{+}$, $R^{++}$ and $R^{+++}$ may also be hydrogen atoms, furthermore. The group needed for the coupling reaction is designated Y. In specific embodiments of this invention it is possible for individual or two or more radicals $R^{+}$, $R^{++}$ and $R^{+++}$ to be of the same kind as $R^{\circ}$, $R^{\circ\circ}$ or $R^{\circ\circ\circ}$. It is also in accordance with the invention if group X and group Y are identical. In that specific case the coupling takes place by means of a coupling reagent or by the action of a catalyst or initiator. Coupling reagent, catalyst or initiator are in this case part of a further component. It is likewise in accordance with the invention if the coupling reaction is initiated by exposure to actinic radiation.

For the purposes of this invention it is possible to use an arbitrarily large number of further such functional segments which may react at least with one of the functional segments defined in the preceding paragraph.

A coupling reaction may proceed by chemical reaction directly between the groups X and Y, so forming a species $(R^{\circ}R^{\circ\circ}R^{\circ\circ\circ}C)—X'—Y'—(CR^{+}R^{++}R^{+++})$. In the case of a chemical reaction, X' and Y' here are the reaction products of the groups X and Y, respectively. In specific cases the coupling of groups X and Y requires a coupling reagent $X^{a}—Y^{a}$ or $X^{a}—R^{a}—Y^{a}$. It is also possible, furthermore, to link two groups X via a coupling reagent $Y—R^{b}—Y$. $R^{a}$ and $R^{b}$ can be saturated or unsaturated, aliphatic or aromatic hydrocarbon radicals and may contain an arbitrary number of heteroatoms. The radicals $R^{a}$ and $R^{b}$ may be of low molecular mass or may be polymeric in nature.

TABLE 1

| Functional segment of type $(R^{\circ}R^{\circ\circ}R^{\circ\circ\circ}C)—X$ with —X = | Functional segment of type $(R^{+}R^{++}R^{+++}C)—Y$ with —Y = | Examples of possible coupling products $(R^{\circ}R^{\circ\circ}R^{\circ\circ\circ}C)—X'—Y'—(CR^{+}R^{++}R^{+++})$ with —X'—Y'— = |
|---|---|---|
| —SH | —SH | —S—S— |
| —$R^{c}C=CR^{d}R^{e}$ | —$R^{f}C=CR^{g}R^{h}$ | —$R^{c}C—C(R^{d}R^{e})$—S—S—$(R^{g}R^{h})C—CR^{f}$— and other linkage patterns |
| —$R^{c}C=CR^{d}R^{e}$ | —SH | —$R^{c}C—C(R^{d}R^{e})$—S— and other linkage patterns |
| —$R^{c}C=CR^{d}R^{e}$ | —$R^{f}C=CR^{g}R^{h}$— | —$R^{c}C—C(R^{d}R^{e})—(R^{g}R^{h})C—CR^{f}$— and other linkage patterns |
| —C(=O)—$R^{i}$ | —$NH_{2}$ | —$R^{i}C=NH$— |
| —C(=O)—$R^{i}$ | —$NHR^{j}$ | —$R^{i}=NR^{j}$— |
| —C(=O)—$R^{i}$ | —C(=$PR^{k}_{3}$)—$R^{j}$ | —$R^{i}C=CR^{j}$— |
| 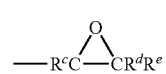 | —OH | —$R^{c}C(OH)—C(R^{d}R^{e})$—O— and other linkage patterns |
| 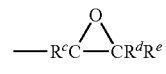 | —$NH_{2}$ | —$R^{c}C(OH)—C(R^{d}R^{e})$—NH— and other linkage patterns |
| 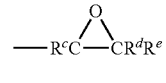 | —$NHR^{j}$ | —$R^{c}C(OH)—C(R^{d}R^{e})—NR^{j}$— and other linkage patterns |
| —C(=O)—OH | —OH | —C(=O)—O— |

TABLE 1-continued

| Functional segment of type $(R^oR^{oo}R^{ooo}C)$—X with —X = | Functional segment of type $(R^+R^{++}R^{+++}C)$—Y with —Y = | Examples of possible coupling products $(R^oR^{oo}R^{ooo}C)$—X'—Y'—$(CR^+R^{++}R^{+++})$ with —X'—Y'— = |
|---|---|---|
| —C(=O)—OH | —NH$_2$ | —C(=O)—NH— |
| —C(=O)—OH | —NHR$^j$ | —C(=O)—NR$^j$— |
| —C(=O)—OH | —NCO | —C(=O)—O—C(=O)—NH— |
| —C(=O)—O—C(=O)—R$^i$ | —OH | —C(=O)—O— |
| —C(=O)—O—C(=O)—R$^i$ | —NH$_2$ | —C(=O)—NH— |
| —C(=O)—O—C(=O)—R$^i$ | —NHR$^j$ | —C(=O)—NR$^j$— |
| —NCO | —OH | —NH—C(=O)—O— |
| —NCO | —NH$_2$ | —NH—C(=O)—NH— |
| —NCO | —NHR$^j$ | —NH—C(=O)—NR$^j$— |
| —NCO | —SH | —NH—C(=O)—S— |
| —OH | —OH | —O— |

Table 1 shows a number of examples of X and Y placed together, and also shows possible inventive combinations of X and Y which lead to direct coupling of the functional segments to form $(R^oR^{oo}R^{ooo}C)$—X'—Y'—$(CR^+R^{++}R^{+++})$. The table makes no claim to completeness, but is intended merely to indicate examples of functional groups, and combinations of functional groups, that can be employed for the purposes of this invention. The skilled worker is aware of further functional groups and functional-group combinations that can likewise be employed in accordance with the invention. The specific reaction conditions can be found for the specified examples by way of the relevant literature of organic chemistry [in this regard see, for example, J. March, Advanced Organic Chemistry, 4th ed., 1992, Wiley, New York or R. C. Larock, Comprehensive Organic Transformations, 2nd ed., 1999, Wiley, New York]. The radicals $R^c$, $R^d$, $R^e$, $R^f$, $R^g$, $R^h$, $R^i$, and $R^j$ in table 1 may independently of one another be saturated or unsaturated, aliphatic or aromatic hydrocarbon radicals, which may contain any desired number of heteroatoms and may be of low molecular mass or may be polymeric in nature, and/or, alternatively, may be hydrogen atoms. In accordance with the definition above, the radicals may be identical or different in construction. The radicals $R^c$, $R^d$ and $R^e$ may be linked to one another, and $R^f$, $R^g$ and $R^h$ may be linked to one another. With particular preference for the purposes of this invention it is also possible to react acid anhydrides with amines.

Where the inventive coupling of the reactive constituents is to proceed by way of the formation of hydrogen bonds, the functional segments involved are defined in accordance with the remarks below. In this regard see, for example, D. Philp, J. F. Stoddard, *Angew. Chem.*, 1996, 108, 1242 or C. Schmuck, W. Wienand, *Angew. Chem.*, 2001, 113, 4493.

At least one kind of inventive functional segments present in at least one reactive constituent in at least one first component has the general structure $(R^\#R^{\#\#}R^{\#\#\#}C)$—$X^\#$. $R^\#$, $R^{\#\#}$ and $R^{\#\#\#}$ may independently of one another be saturated or unsaturated, aliphatic or aromatic hydrocarbon radicals, which may also be linked to one another, and may be identical or different. The radicals $R^\#$, $R^{\#\#}$, and $R^{\#\#\#}$ may independently of one another include any desired number of heteroatoms. The radicals $R^\#$, $R^{\#\#}$, and $R^{\#\#\#}$ may be of low molecular mass or may be polymeric in nature. Up to two of the radicals $R^\#$, $R^{\#\#}$, and $R^{\#\#\#}$ may also be hydrogen atoms, furthermore. The group needed for the coupling reaction is designated $X^\#$.

The at least one inventive segment of the structure $(R^\#R^{\#\#}R^{\#\#\#}C)$—$X^\#$ is able to form hydrogen bonds with at least one functional segment which is present in at least one reactive constituent in at least one optionally second component and which has the general structure $(R^\sim R^{\sim\sim} R^{\sim\sim\sim}C)$—Y. $R^\sim$, $R^{\sim\sim}$, and $R^{\sim\sim\sim}$ may independently of one another be saturated or unsaturated, aliphatic or aromatic hydrocarbon radicals which may also be linked to one another and may be identical or different. The radicals $R^\sim$, $R^{\sim\sim}$, and $R^{\sim\sim\sim}$ may independently of one another include any desired number of heteroatoms. The radicals $R^\sim$, $R^{\sim\sim}$, and $R^{\sim\sim\sim}$ may be of low molecular mass or may be polymeric in nature. Up to two of the radicals $R^\sim$, $R^{\sim\sim}$, and $R^{\sim\sim\sim}$ may also be hydrogen atoms, furthermore. The group needed for the coupling reaction is designated $Y^\sim$. In specific embodiments of this invention it is possible for individual radicals or two or more radicals $R^\sim$, $R^{\sim\sim}$, $R^{\sim\sim\sim}$ to be of the same kind as $R^\#$, $R^{\#\#}$ or $R^{\#\#\#}$. It is also in accordance with the invention if group $X^\#$ and group $Y^\sim$ are identical. In that specific case the coupling takes place by means of a coupling reagent which is part of a further component.

For the purposes of this invention it is possible to use an arbitrarily large number of further such functional segments which may react at least with one of the functional segments defined in the preceding paragraph.

A coupling reaction may proceed by formation of hydrogen bonds directly between the groups $X^\#$ and $Y^\sim$, so forming a species $(R^\#R^{\#\#}R^{\#\#\#}C)$—$X^\#$—$Y^\sim$—$(CR^\sim R^{\sim\sim} R^{\sim\sim\sim})$. In specific cases the coupling of groups $X^\#$ and $Y^\sim$ requires a coupling reagent $X^{\#a}$—$Y^{-a}$ or $X^{\#a}$—$R^{a'}$—$Y^{-a}$. It is also possible, furthermore, to link two groups $X^\#$ via a coupling reagent $Y^\sim$—$R^{b'}$—$Y^\sim$. $R^{a'}$ and $R^{b'}$ can be saturated or unsaturated, aliphatic or aromatic hydrocarbon radicals and may include an arbitrary number of heteroatoms. The radicals $R^{a'}$ and $R^{b'}$ may be of low molecular mass or may be polymeric in nature.

The coupleable functional segments may be unidentate or, preferably, multidentate. Denticity refers in this case to the capacity of a segment to form a particular number of hydrogen bonds.

Hydrogen bonds between unidentate or, preferably, multidentate functional segments are known, as structure-forming elements, from a variety of examples. In nature, hydrogen bonds between complementary functional segments are used for the construction of deoxyribonucleic acid (DNA) and ribonucleic acid (RNA). A specific combination of donor and acceptor sites makes it possible for couplings to be able to take place only in accordance with the lock-and-key principle. Where, for example, the functional segments α ("key" type) and β ("lock" type) are complementary segments which are able to form hydrogen bonds, a connection is possible between α and β but not between α and α or between β and β. With regard to the selection of functional segments, nature, when constructing DNA, restricts itself to the two organic base pairs adenine/thymine (or uracil instead of thymine in RNA) as bidentate segments, and cytosine/guanine as tridentate segments.

For the purposes of this invention it is possible to use reactive constituents having functional segments based on adenine, thymine, uracil, cytosine, guanine, derivatives thereof, and also further compounds capable of forming hydrogen bonds by the lock-and-key principle, such as, for example, 2-ureido-4-pyrimidone and its derivatives, 2,6-diacetylaminopyridine and its derivatives, diacetylpyrimidine and its derivatives, and ureidoacylpyrimidine and its derivatives. This listing makes no claim to completeness. Instead, the skilled worker is aware of further systems which can be used in accordance with the invention. When this kind of functionalization is chosen, then, for the purposes of this invention, at least one constituent in at least one component carries at least two functional segments of the "key" type, and at least one constituent of at least one further component carries at least two functional segments of the "lock" type. FIG. 1 shows two examples of the coupling of reactive constituents via formation of hydrogen bonds, by using two complementary functional segments, with FIG. 1a showing the direct coupling of two reactive constituents and FIG. 1b the coupling of two reactive constituents using a coupling reagent.

Likewise possible in accordance with the invention is the coupling of functional segments via coordinate bonds. Examples of coordinate bonds are ligand-central atom bonds in complexes, i.e., the formation of a coordinate bond with metal atoms which may be present in elemental form, in the form of metal salts and/or in the form of metal complexes, and also all other donor-acceptor bonds [in this regard see, for example, D. Philp, J. F. Stoddard, *Angew. Chem.*, 1996, 108, 1242; M. Rehahn, *Acta Polym.*, 1998, 49, 201; B. G. G. Lohmeijer, U. S. Schubert, *J. Polym. Sci. A Polym. Chem.*, 2003, 41, 1413 and literature cited in each of these references].

If this coupling principle is chosen for the purposes of this invention, then at least one kind of inventive functional segments present in at least one reactive constituent in at least one first component has the general structure $(R^\S R^{\S\S} R^{\S\S\S} C)-X^\S$. $R^\S$, $R^{\S\S}$ and $R^{\S\S\S}$ may independently of one another be saturated or unsaturated, aliphatic or aromatic hydrocarbon radicals which may also be linked to one another, and may be identical or different. The radicals $R^\S$, $R^{\S\S}$, and $R^{\S\S\S}$ may independently of one another include any desired number of heteroatoms. The radicals $R^\S$, $R^{\S\S}$, and $R^{\S\S\S}$ may be of low molecular mass or may be polymeric in nature. Up to two of the radicals $R^\S$, $R^{\S\S}$, and $R^{\S\S\S}$ may also be hydrogen atoms, furthermore. The group needed for the coupling reaction is designated $X^\S$.

Figure 2:
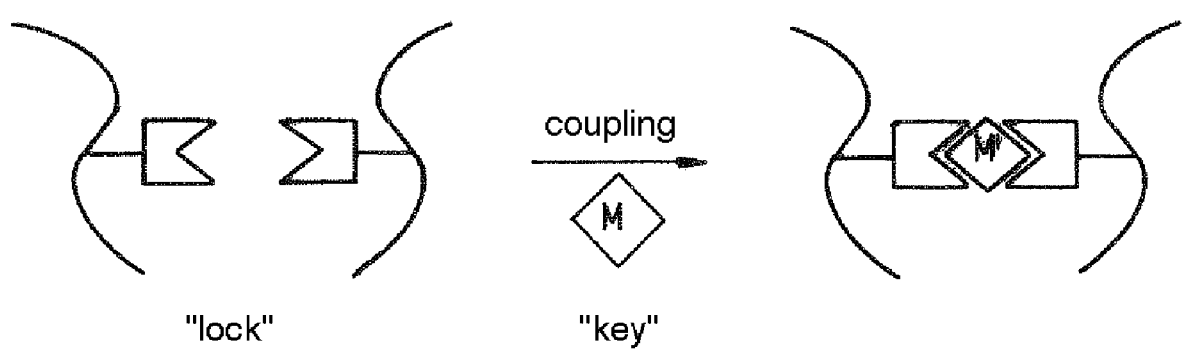
FIG. 2 shows diagrammatic representations of the coupling of two components by means of coordinate bonds.
Figure 2:
Figure 2:

The functional segments in at least one constituent in at least one component are constructed such that they include groups capable of being able to form coordinate bonds with metals of type M, which may be in elemental form, in metal salt form or in the form of metal complexes. Metal complexes may also be polynuclear. Unidentate or multidentate segments may be employed. The coupling principle is represented diagrammatically in FIG. 2. At least two functional segments of the "key" type couple by coordination of M, which takes on the "lock" function. During the formation of the coordinate bond, the structure of M may alter to become M'. This may be manifested in altered oxidation states or else in an altered ligand structure and/or ligand composition. When using metal atoms it is particularly advantageous for the purposes of this invention to take special precautions to disperse M in the components comprising M, and also in the mix of components that is produced during the operation of the invention. This is preferably accomplished by choosing particularly suitable counterions, in the case of metal salts, or particularly suitable complex ligands, in the case of metal complexes. Suitable counterions and complex ligands therefore take on the function of compatibilizers and dispersing assistants.

Particular preference is given to coupling using chelating segments. Examples of ligands which may be employed as functional segments are bipyridine and terpyridine and also their derivatives, acetylacetonate and its derivatives, ethylenediaminetetraacetic acid and its derivatives, nitrilotriacetic acid and its derivatives, hydroxyethylethylene-diaminetriacetic acid and its derivatives, diethylenetriaminepentaacetic acid and its derivatives, and carboxylic acids. This listing makes no claim to completeness. Instead, the skilled worker will be aware of further systems which may be used in accordance with the invention. These functional segments are not reactive with one another. All constituents comprising these functional segments can therefore be used in one component. The coupling of the functional segments takes place as soon as at least one reactive constituent in at least one further component metal atoms M with them are mixed. Metal atoms M are likewise classed as functional segments in this invention.

Suitable metal atoms for the purposes of this invention are all those chemical elements capable of acting as an acceptor for coordinate bonds. These are alkaline earth metals, preferably Ca and/or Mg, transition metals, preferably Ti, Mn, Fe, Co, Ni, Cu, Zn, Mo, Ru, Rh, Pd, W, Re, Os, Ir and/or Pt, and also Al and lanthanoids. Examples of suitable compatibilizers and dispersing assistants for these metal atoms which can be used in accordance with the invention are alkoxides of aliphatic or aromatic, saturated or unsaturated molecules containing any desired number of heteroatoms, it being possible for these molecules to be of low molecular mass or to be polymeric in nature. Additionally suitable are open-chain or cyclic unsaturated hydrocarbons, which may contain any desired number of heteroatoms and may be of low molecular mass or may be polymeric in nature. Further dispersing assistants and compatibilizers for M that can be used in accordance with the invention are low molecular mass chelating compounds of organic identity.

Figure 3:
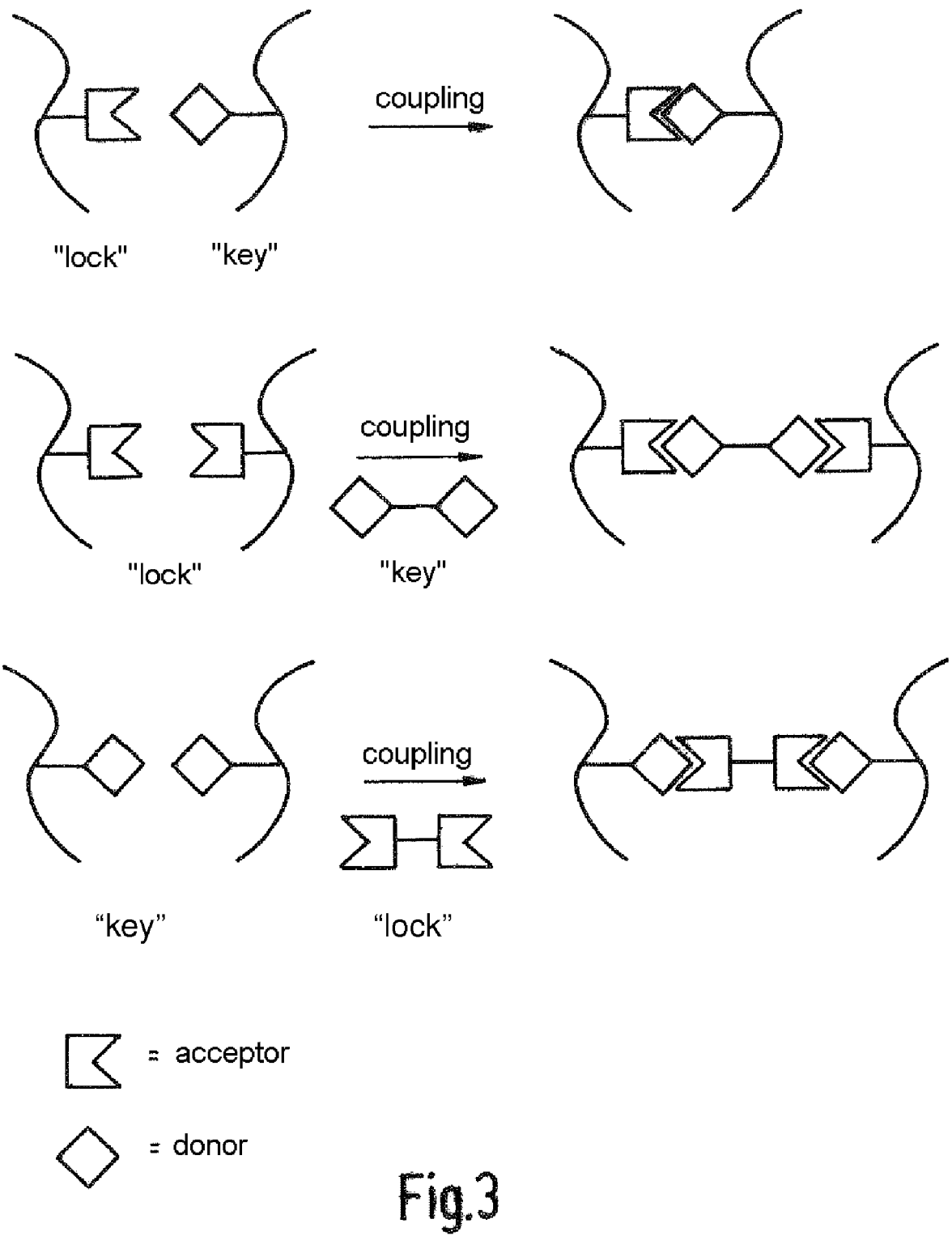
FIG. 3 shows diagrammatic representations of the coupling of two components by means of coordinate bonds, using the lock-and-key principle.

Generally speaking, M can be an acceptor group ("key") which in conjunction with a donor group of the "lock" type is able to form a coordinate bond. In this case the acceptor group may be attached to a prepolymer or else may be used in the form of coupling reagents. This general case is represented diagrammatically in FIG. 3. It is further in accordance with the invention to use prepolymers equipped with acceptor groups in combination with coupling reagents which carry donor groups.

For the purposes of this invention it is possible for any desired combinations of different types of coupling reactions to be employed.

As has already been described in connection with the definition of the inventive construction of reactive constituents, the at least two functional segments in at least one prepolymer may be located, depending on the type and structure of a reactive constituent, for example, at chain ends, at chain center points, at block transition points, arm linkage points, branching points and/or grafting points, and/or, through the selection and use of specific comonomers, may be incorporated randomly in the polymerization of the prepolymers. Functional segments in a low molecular mass compound of the B5 type are present at any desired positions—but at least two positions—within this reactive constituent.

Comonomers which can be used with particular advantage for the purposes of this invention in order to construct functionalized prepolymers, without any claim to completeness, include glycidyl methacrylate, glycidyl acrylate, allyl glycidyl ether, 2-hydroxyethyl methacrylate, 2-hydroxyethyl acrylate, 3-hydroxypropyl methacrylate, 3-hydroxypropyl acrylate, 4-hydroxybutyl methacrylate, 4-hydroxybutyl acrylate, acrylic acid, methacrylic acid, itaconic acid, crotonic acid, methacrylamide, acrylamide, N-methylolmethacrylamide, N-methylolacrylamide, vinyl alcohol, 2-hydroxyethyl vinyl ether, 3-hydroxypropyl vinyl ether, 4-hydroxybutyl vinyl ether, maleic anhydride, and itaconic anhydride.

The molar ratio of at least two different kinds of functional segments can be controlled in accordance with the invention through the ratio in which the at least two reactive constituents comprising these at least two functional segments of different kinds are employed, and/or through the number of at least two functional segments of different kinds that are incorporated in the respective—at least one—reactive constituent. At least two different kinds of functional segments are employed in accordance with the invention. These at least two kinds of functional segments, which are able to couple with one another, are employed for the purposes of this invention in a molar ratio of 1:100 to 100:1, preferably of 1:10 to 10:1, more preferably of 1:5 to 5:1. Stoichiometric use is therefore likewise in accordance with the invention. Where more than two kinds of functional segments which can couple with one another are used, then it is possible to employ each individual kind of functional segments from 100-fold excess to 100-fold deficit in relation to each other kind of functional segments, preferably from 10-fold excess to 10-fold deficit, more preferably from 5-fold excess to 5-fold deficit.

In one preferred version of this invention the selection of the nature of the functional segments and the nature and amount of optionally employable catalysts and initiators, and also the choice of operating temperature, lead to a defined reactivity of the mix of components. This goes hand in hand with a rise in viscosity with the reaction time. At the time of coating, the viscosity of the mix of components must be low enough that the mix is still capable of being used for coating. In a given combination of nature of the functional segments, nature and amount of optionally employable catalysts and initiators, and operating temperature, it is the residence time of the component system, i.e., the time which one volume element of the mix of components spends in the operating installation between the beginning of mixing and the coating operation, that determines whether it is still coatable or not. The residence time can be varied by mass supply, throughput, and coating speed. A combination of nature of the functional segments and nature and amount of optionally employable catalysts and initiators is in accordance with the invention when, at least one operating temperature in accordance with the invention, it tolerates a residence time of one day, preferably one hour, more preferably ten minutes, and is then still coatable.

Solvent-Free Coating Operation

The preferably solvent-free processing of the PSA of the invention constitutes, for the purposes of this invention, the separate storage of the individual starting components, the conveying of the individual starting components, the mixing of the starting components, the operation of coating the mixture of the starting components, the after-treatment of the coated PSA, the optional lamination of further carriers, including, optionally, coated carriers, release films and release papers, including, optionally, coated release films and release papers, and the winding of the self-adhesive product produced.

The preparation of the PSAs of the invention takes place solventlessly in a multi-component component reactive process, preferably in a two-component reactive process. Where one of the components employed is composed of more than one constituent, then this component is homogenized in a commercially customary, evacuable dissolver before being mixed with the at least one further component. Application of a vacuum in the course of this procedure leads to bubble-free constituent mixtures. The homogenized components are then made available for the mixing and coating operation. The mixing of the at least two components takes place less than one day, preferably less than one hour, more preferably less than ten minutes before coating is carried out using a multi-component component mixing and metering unit, preferably using a two-component mixing and metering unit, with a dynamic mixer system. A review of metering units which can be employed in accordance with the invention can be found for example in Adhäsion—Kleben & Dichten, 2002, No. 10, page 29 ff. This invention, however, is not confined to the units compiled in that review.

The components can be supplied from drums or other containers to the metering and mixing unit, or else can be supplied by means of a continuous operation. Appropriate for that purpose is the direct coupling of the metering and mixing system with a concentrating extruder, if solvent still has to be removed from a component.

The operating temperature is guided by the reactive groups selected for the purposes of this invention, and also by further, optionally employable constituents which affect the reaction between the reactive constituents, and by the consequent provisos relating to the residence time between start of mixing and coating operation. In accordance with the invention the operation of the unit is at operating temperatures between $-20°$ C. and $+100°$ C., preferably between $0°$ C. and $+60°$ C., very preferably between $+20°$ C. and $+35°$ C. The operating temperature may be kept at a constant level throughout the operation up to the point of coating, or else may adopt different temperature levels in different operating segments. For instance, the thermal conditioning of the reservoir vessels for the components employed is in principle decoupled from the thermal conditioning of the conveying elements and pipelines, of the mixing assembly, and of the coating unit in the operation of the invention.

Coating methods which can be employed for the purposes of this invention include knife coating methods, nozzle knife coating methods, rolling rod nozzle methods, extrusion nozzle methods, casting nozzle methods, and caster methods. Likewise in accordance with the invention are application methods such as roll application methods, printing methods, screen-printing methods, patterned roll methods, ink-jet methods, and spraying methods. For the feeding of the coating assembly of the invention it is possible as an option to include a conveying and/or mixing assembly, e.g., a single-screw or twin-screw extruder, between metering and mixing unit and coating assembly. The extruder which can be used as one alternative is separately heatable. A twin-screw extruder is appropriate in those cases in accordance with the invention when further constituents, particularly solid constituents such as fillers, for example, are to be added to the mix of components.

After the coating operation and prior to winding, optionally, the PSA can be run through a tunnel in which, alternatively, thermal energy, by means for example of electrical heating or IR radiation, and/or actinic radiation, such as UV radiation and/or electron beams, for example, can act on the coated material.

Inventive Self-Adhesive Products

Figure 4:
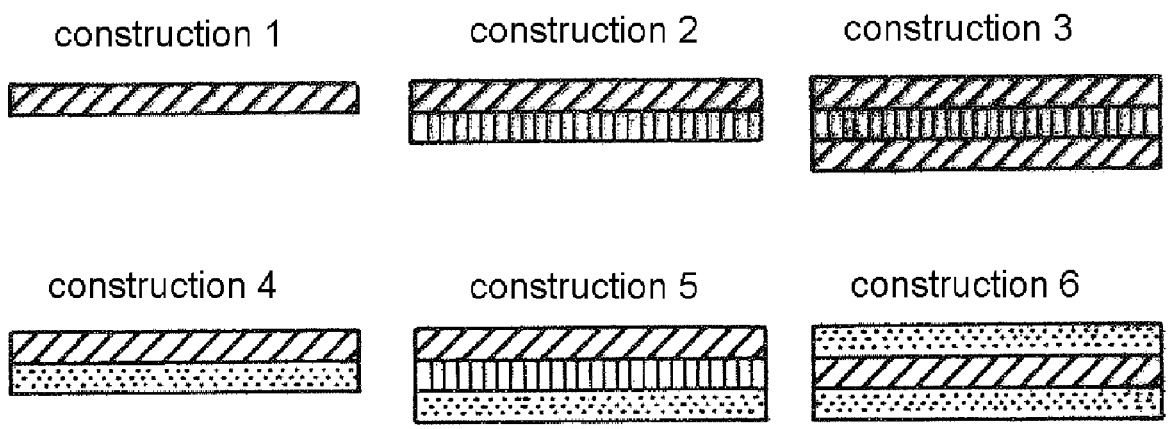
FIG. 4 shows diagrammatic representations of self-adhesive products comprising pressure-sensitive adhesives produced in accordance with the process of the present invention.

The PSA system of the invention can be utilized, via the processing and coating operation of the invention, for constructing different kinds of self-adhesive products such as, in particular, self-adhesive tapes and self-adhesive sheets. Inventive constructions of self-adhesive products are depicted in FIG. 4, using self-adhesive tapes as the example. Each layer in the self-adhesive product constructions of the invention may, as an alternative, be in foamed form.

In the simplest case a self-adhesive tape of the invention is composed of the PSA in single-layer construction (construction 1). Construction 1 may optionally be lined on one or both sides with release film or release paper. The layer thickness of the PSA is between 1 μm and 2000 μm, preferably between 5 μm and 1000 μm.

The PSA may additionally be on a carrier, in particular a film or paper carrier (construction 2). The carrier in this case may have been pretreated in accordance with the prior art on the side facing the PSA, so that, for example, an improvement in PSA anchorage is obtained. The side may also have been provided with a functional layer which can act, for example, as a barrier layer. The reverse of the carrier may have been pretreated in accordance with the prior art so as to achieve, for example, a release effect. The reverse of the carrier may also have been printed. The PSA may optionally be lined with a release paper or release film. The PSA has a layer thickness of between 1 μm and 2000 μm, preferably between 5 μm and 1000 μm.

In the case of the construction 3 the product is a double-sided self-adhesive strip comprising as its middle layer a carrier film, a carrier paper or a carrier foam. In construction 3, inventive PSAs of the same or different kind and/or of the same or different layer thickness are employed as top and bottom layers. The carrier may in this case have been pretreated in accordance with the prior art on one or both sides, thereby achieving, for example, an improvement in PSA anchorage. It is also possible for one or both sides to have been provided with a functional layer which can function, for example, as a barrier layer. The PSA layers may optionally be lined with release papers or release films. The layers of PSA, independently of one another, have thicknesses of between 1 μm and 2000 μm, preferably between 5 μm and 1000 μm.

As a further double-sided self-adhesive tape, construction 4 is one inventive variant. A PSA layer of the invention carries on one side a further PSA layer, which, however, may be of any desired nature and therefore need not be inventive. The self-adhesive tape construction may be lined optionally with one or two release films or release papers. The layers of PSA independently of one another have thicknesses of between 1 μm and 2000 μm, preferably between 5 μm and 1000 μm.

As in construction 4, construction 5 comprises a double-sided self-adhesive tape which comprises a PSA of the invention and also one other PSA of any kind. In construction 5, however, the two PSA layers are separated from one another by a carrier, a carrier film, a carrier paper or a carrier foam. The carrier in this case may have been pretreated in accordance with the prior art on one or both sides, thereby achieving, for example, an improvement in PSA anchorage. It is also possible for one or both sides to have been provided with a functional layer which can function, for example, as a barrier layer. The PSA layers may optionally be lined with release papers or release films. The PSA layers independently of one another have thicknesses of between 1 μm and 2000 μm, preferably between 5 μm and 1000 μm.

The self-adhesive tape of the invention according to construction 6 comprises a layer of inventive material as a middle layer, which is provided on both sides with any desired PSAs of identical or different type. One or both sides of the middle layer may have been provided with a functional layer which can function, for example, as a barrier layer. For the outer PSA layers it is not necessary for inventive PSAs to be employed. The outer PSA layers may optionally be lined with release papers or release films. The outer PSA layers have thicknesses, independently of one another, of between 1 μm and 2000 μm, preferably between 5 μm and 1000 μm. The thickness of the middle layer is between 1 μm and 2000 μm, preferably between 5 μm and 1000 μm.

The invention is illustrated below with reference to an example.

Test Methods

Gel Permeation Chromatography (Test A)

The average molecular weight $M_w$ and the polydispersity D were determined by gel permeation chromatography. The eluent used was THF containing 0.1% by volume trifluoroacetic acid. Measurement was made at 23° C. The precolumn used was PSS-SDV, 10μ, $10^3$ Å, ID 8.0 mm×50 mm. Separation was carried out using the column combination PSS-SDV, 10μ, linear-one with ID 8.0 mm×300 mm. The sample concentration was 1 g/l, the flow rate 0.5 ml per minute. Measurement was carried out against polystyrene standards.

Determination of Melt Viscosity (Test B)

The melt viscosity employed is the complex zero-shear viscosity at +60° C., which is calculated from linearly viscoelastic data and obtained by extrapolation to a shear rate of zero. It is determined using an RDA2 from Rheometrics in plate/plate geometry with oscillatory shearing. The plate diameter was 25 mm and the deformation was 1%. A frequency/temperature variation was run, the temperature being preadjusted in steps of 5 K over a range from −60° C. to +200° C., and a frequency test from 0.1 rad/s to 100 rad/s being carried out at each temperature.

Determination of Plateau Modulus (Test C)

The plateau modulus was determined by the principle also used for determining the melt viscosity (Test B), but applied to crosslinked samples. The plateau modulus used is the value of the storage modulus at 1 rad/s and 25° C.

Determination of Dynamic Glass Transition Temperature (Test D)

The dynamic glass transition temperature was determined by the principle also used in determining the melt viscosity (Test B). The dynamic glass transition temperature read off is the temperature at which the loss modulus exhibits a maximum in a temperature sweep at 1 rad/s.

Determination of Gel Fraction (Test E)

The solvent-free PSA samples are welded into a nonwoven polyethylene pouch (Tyvek web). Soluble constituents are extracted with toluene over a period of three days, the solvent being replaced daily. The difference in sample weights before and after extraction gives the gel value, as a percentage figure for the weight fraction of the polymer which is not extractable with toluene.

Bond Strength (Test F)

The peel strength (bond strength) was tested in a method based on PSTC-1. A PSA layer 50 μm thick is applied to a PET film 25 μm thick. A strip of this specimen 2 cm wide is adhered to a sanded steel plate by rolling over the specimen back and forth five times using a 5 kg roller. The plate is clamped in and the self-adhesive strip is pulled off from its free end on a tensile testing machine at a peel angle of 180° and a speed of 300 mm/min.

Holding Powers

The test took place by a method based on PSTC-7. A PSA layer 50 μm thick is applied to a PET film 25 μm thick. A strip of this specimen 1.3 cm wide is adhered to a polished steel plaque over a length of 2 cm using a 2 kg roller, the specimen being rolled over back and forth twice. The plaques are equilibrated under test conditions (temperature and atmospheric humidity) for 30 minutes, but without a load. Then the test weight is hung on, thereby producing a shearing stress parallel to the bonding plane, and a measurement is made of the time taken for the bond to fail. If a holding time of 10 000 minutes is reached, the experiment is discontinued before the adhesive bond fails.

EXAMPLE

TABLE 2

| Vazo 67 ® | DuPont |
| Vestanat IPDI ® | Hüls |
| Coscat 83 ® | C. H. Erbslöh |

All of the monomers and solvents used are of technical grade.

Preparation of a Regulator for Controlled Free-Radical Polymerization:

Dibenzyl trithiocarbonate was prepared by a specification which can be found in *Synth. Commun.*, 1988, 18, 1531, from benzyl bromide, carbon disulfide, and aqueous sodium hydroxide solution.

Example: Component A selected was a random copolymer of type A2, consisting of 2-ethylhexyl acrylate, n-butyl acrylate, and 2-hydroxyethyl methacrylate. Component B consisted of isophorone diisocyanate (Vestanat IPDI®), a system of type B5, and a catalyst (Coscat 83®) that promotes the thermal reaction of hydroxyl groups with isocyanate groups.

Preparation and characterization of component A: A 2 l steel reactor conventional for free-radical polymerization was charged under nitrogen with 285 g of 2-ethylhexyl acrylate, 285 g of n-butyl acrylate, 30 g of 2-hydroxyethyl methacrylate, 400 g of acetone, and 15.3 g of dibenzyl trithiocarbonate. The reactor was heated to an internal temperature of 58° C. and the monomer mixture was initiated with 0.1 g of Vazo 67® (DuPont). After 4 hours 40 minutes, a further 0.1 g of Vazo 67® initiator was added. The temperature at this point was 67° C. After 24.5 hours the reactor was cooled and the polymer solution was drained off. The product was freed from solvent in a vacuum drying cabinet. GPC (Test A) gave $M_w$=18 000 g/mol with a polydispersity of 1.23. Rheological measurements (Test B) gave a zero-shear viscosity for the melt at 60° C. of $\eta$=9 Pa s. The dynamic glass transition temperature (Test D) of component A was −45° C.

Blending of the components and coating: 50 g of component A and 2.44 g of component B, consisting of 2.28 g of Vestanat IPDI® and 0.16 g of Coscat 83®, were blended with one another at 25° C. A homogeneous mixture was produced with shearing of the mixture at about 5 1/s over a period of 2 minutes, and was then coated onto siliconized release paper using a doctor blade. The coatweight was 50 g/m². After 3 hours, specimens (double-sided self-adhesive tapes) were taken and were subjected to Tests C, D and E. A part of the material was transfer-laminated onto a PET film 25 μm thick. Specimens of this material (single-sided self-adhesive tapes) were subjected to Tests F and G.

Product Properties:

With a gel fraction (Test E) of 82%, the specimens displayed a bond strength (Test F) on steel of 0.4 N/cm. The holding powers (Test G) were>10 000 minutes for a load of 1 kg at 23° C. Test C gave a plateau modulus of $10^5$ Pa. The dynamic glass transition temperature (Test D) at 1 rad/s was found to be −30° C.

The example illustrates that via the process of the invention, using an inventive combination of inventive components, it is possible to produce pressure-sensitive adhesives and, from them, self-adhesive tapes. An appropriate choice of the number and composition of the components employed provides access to pressure-sensitive adhesives of high shear strength which at the same time have a melt viscosity which is advantageously low for the coating operation.

The invention claimed is:

1. A process for producing a pressure-sensitive adhesive which is constructed by coupling at least one reactive constituent present in at least one component with at least one further reactive constituent present in at least one further component, the at least one reactive constituent in the at least one component containing at least two functional groups, and the at least one constituent in the at least one further component containing at least two functional groups;

at least one reactive constituent of at least one component employed being a functionalized acrylate copolymer which has a weight average of its molar mass distribution between 5000 g/mol and 200 000 g/mol, the acrylate copolymer being a copolymer constructed from at least one nonfunctionalized kind of monomer and at least one functionalized kind of monomer, the at least two functional groups being introduced in the form of the copolymerized functionalized kind of monomer; and the components for preparing the pressure-sensitive adhesive being processed solventlessly.

2. The process of claim 1, wherein the pressure-sensitive adhesive is constructed by coupling the at least one reactive constituent in the at least one component with the at least one reactive constituent in the at least one further component, the coupling of the at least two reactive constituents beginning during the mixing of the at least two components comprising these reactive constituents.

3. The process of claim 1, wherein the pressure-sensitive adhesive is constructed by coupling the at least one reactive constituent in the at least one component with the at least one reactive constituent in the at least one further component, the coupling of the reactive constituents being initiated after the coating of the components mixture, by exposure to actinic radiation.

4. The process of claim 1, wherein said coupling takes place at a temperature between −20° C. and +100° C.

5. The process of claim 4, wherein said temperature is between 0° C. and +60° C.

6. The process of claim 5, wherein said temperature is between +20° C. and +35° C.

7. The process of claim 1, wherein the pressure-sensitive adhesive is constructed from two components.

8. The process of claim 1, wherein all of the components employed have a zero-shear viscosity in the melt at +60° C. of below 10 kPa s.

9. The process of claim 1, wherein at least one component has a zero-shear viscosity in the melt at +60° C. of above 1 kPa s.

10. The process of claim 1, wherein at least one component contains at least one kind of reactive constituents with a proportion of at least 20%, more than 80% in difunctionalized form, the type of functionalization being selected such that, with at least one functionalization type which is present in at least one kind of reactive constituents in at least one further component, in the mixed state it reacts spontaneously or can be brought to reaction.

11. The process of claim 10, wherein at least one reactive constituent in at least one component carries at least three functional groups.

12. The process of claim 10, wherein the type of functionalization of at least one first kind of the reactive constituents employed in the intermixed at least two components is such that, with at least one further functionalization type of at least one second kind of reactive constituents, spontaneously or by mediation of activating catalysts, coupling agents or initiators and/or by influence of temperature and/or actinic radiation, a chemical reaction takes place which leads to covalent coupling between the at least one first kind and the at least one second kind of reactive constituents.

13. The process of claim 10, wherein the type of functionalization of at least one first kind of the reactive constituents employed in the intermixed at least two components is such that, with at least one further functionalization type of at least one second kind of reactive constituents, spontaneously or by mediation of catalysts, coupling agents or initiators and/or by influence of temperature and/or actinic radiation, one or more hydrogen bonds are formed which leads to coupling between the at least one first kind and the at least one second kind of reactive constituents.

14. The process of claim 10, wherein the type of functionalization of at least one first kind of the reactive constituents employed in the intermixed at least two components is such that, with at least one further functionalization type of at least one second kind of reactive constituents, spontaneously or by mediation of catalysts, coupling agents or initiators and/or by influence of temperature and/or actinic radiation, one or more coordinate bonds are formed which leads to coupling between the at least one first kind and the at least one second kind of reactive constituents.

15. The process of claim 14, wherein the type of functionalization of at least one kind of the reactive constituents employed in at least one component is such that a coordinate bond with at least one metal atom, metal ion or metal complex, as at least one further kind of reactive constituents in at least one further component, comes about in the formation of chelate complexes, which leads to noncovalent coupling of the reactive constituents.

16. The process of claim 1, wherein at least one component comprises, as at least one kind of reactive constituents, a linear, branched, graft or star polymer which is constructed from at least one nonfunctionalized kind of monomer and which is functionalized at least at two points of the macromolecule.

17. The process of claim 1, wherein at least one component comprises, as at least one kind of reactive constituents, a linear, branched, graft or star copolymer which is constructed from at least one nonfunctionalized kind of monomer and at least one functionalized kind of monomer and which is functionalized at least at two points of the macromolecule, the at least two functionalizations being introduced optionally in the form of randomly copolymerized functionalized comonomers.

18. The process of claim 1, wherein at least one component comprises, as at least one kind of reactive constituents, a linear, branched, graft or star block copolymer which is constructed from at least two different polymer blocks, each composed of at least one nonfunctionalized kind of monomer, and which is functionalized at least at two points of the macromolecule.

19. The process of claim 1, wherein at least one component comprises, as at least one kind of reactive constituents, a linear, branched, graft or star block copolymer which is constructed from at least two different polymer blocks, at least one polymer block being constructed as a copolymer block and having been prepared from at least one nonfunctionalized kind of monomer, and at least one functionalized kind of monomer and which is functionalized at least at two points of the macromolecule, the at least two functionalizations being introduced optionally in the form of randomly copolymerized functionalized comonomers in the at least one copolymer block.

20. The process of claim 16, wherein one or more of the following systems are employed: polyethers, polytetrahydrofuran, polydienes, hydrogenated polydienes, polyesters, polycarbonate, polycaprolactone, polymers of vinylaromatic monomers, polyalkyl vinyl ethers, polyvinyl acetate, polymers of $\alpha,\beta$-unsaturated esters, or copolymers of nonfunctionalized acrylates and/or methacrylates.

21. The process of claim 17, wherein copolymers based on a mixture of vinyl compounds and/or $\alpha,\beta$-unsaturated esters are employed,
   (a) the structure of the nonfunctionalized monomers used for copolymerizing the copolymers being given by $CH_2=CH(R^1)(COOR^2)$, $R_1$ being $=H$ or $CH_3$ and $R^2$ being $=H$ or a linear, branched or cyclic, saturated or unsaturated hydrocarbon radical having 1 to 30 carbon atoms;
   (b) the structure of the functionalized monomers used for copolymerizing the copolymers being given by $CH_2=CH(R^1)(COOR^2)$, $R^1$ being $=H$ or $CH_3$ and $R^2$ being $=H$ or a linear, branched or cyclic, saturated or unsaturated hydrocarbon radical having 1 to 30 carbon atoms which carries at least one functionalization type; and
   (c) the fraction of functionalized monomers, based on the amount of total monomers from which the copolymer is constructed, being up to 20%.

22. The process of claim 18, wherein in the polymer blocks one or more of the following systems are employed: polyethers, polydienes, hydrogenated polydienes, polyesters, polycarbonate, polycaprolactone, polymers of vinylaromatic monomers, polyalkyl vinyl ethers, polyvinyl acetate, polymers of $\alpha,\beta$-unsaturated esters, or copolymers of nonfunctionalized acrylates and/or methacrylates.

23. The process of claim 19, wherein the at least one copolymer block is based on a mixture of vinyl compounds and/or $\alpha,\beta$-unsaturated esters,
   (a) the structure of the nonfunctionalized monomers used for copolymerizing the copolymer blocks being given by $CH_2=CH(R^1)(COOR^2)$, $R^1$ being $=H$ or $CH_3$ and $R^2$ being $=H$ or a linear, branched or cyclic, saturated or unsaturated hydrocarbon radical having 1 to 30 carbon atoms;
   (b) the structure of the functionalized monomers used for copolymerizing the copolymer blocks being given by $CH_2=CH(R^1)(COOR^2)$, $R^1$ being $=H$ or $CH_3$ and $R^2$ being $=H$ or a linear, branched or cyclic, saturated or unsaturated hydrocarbon radical having 1 to 30 carbon atoms which carries at least one functionalization type; and (c) the fraction of functionalized monomers, based on the amount of total monomers from which the at least one copolymer block is constructed, being up to 20%.

24. The process of claim 1, wherein, in addition to at least one first component which comprises at least one reactive constituent, at least one second component is used which comprises at least one further kind of reactive constituents, being more than 80% in difunctionalized or higher polyfunctionalized form, the type of functionalization being such that, with at least one functionalization type which is present in at least one kind of reactive constituents in the at least one first component, in the mixed state, it reacts spontaneously or can be brought to reaction.

25. The process of claim 24, wherein the at least one second component comprises, as at least one kind of reactive constituents, a linear, branched, graft or star polymer which is constructed from at least one nonfunctionalized kind of monomer and which is functionalized at least at two points of the macromolecule.

26. The process of claim 24, wherein the at least one second component comprises, as at least one kind of reactive constituents, a linear, branched, graft or star copolymer which is constructed from at least one nonfunctionalized kind of monomer and at least one functionalized kind of monomer and which is functionalized at least at two points of the macromolecule, the at least two functionalizations being introduced in the form of randomly copolymerized functionalized comonomers.

27. The process of claim 24, wherein the at least one second component comprises, as at least one kind of reactive constituents, a linear, branched, graft or star block copolymer which is constructed from at least two different polymer blocks, each composed of at least one nonfunctionalized kind of monomer, and which is functionalized at least at two points of the macromolecule.

28. The process of claim 24, wherein the at least one second component comprises, as at least one kind of reactive constituents, a linear, branched, graft or star block copolymer which is constructed from at least two different polymer blocks, at least one polymer block being constructed as a copolymer block and comprises at least one nonfunctionalized kind of monomer, and at least one functionalized kind of monomer and which is functionalized at least at two points of the macromolecule, the at least two functionalizations being introduced optionally in the form of randomly copolymerized functionalized comonomers.

29. The process of claim 1, wherein at least one reactive constituent in at least one component is a low molecular mass functionalized substance which has a molar mass below 5000 g/mol, the degree of functionalization being at least two, the number of molecules having this functionalization being above 80%, and the type of functionalization being such that, with at least one functionalization type which is present in at least one reactive constituent in at least one further component, in the mixed state, it reacts spontaneously or can be brought to reaction.

30. A pressure-sensitive adhesive obtained by the process of claim 1.

31. The pressure-sensitive adhesive of claim 30, comprising at least one nonfunctionalized or monofunctionalized polymer of linear, branched, graft or star structure, the at least one nonfunctionalized or monofunctionalized polymer being a homopolymer, a copolymer or a block copolymer containing any desired number of homopolymer blocks and/or copolymer blocks, the at least one nonfunctionalized or monofunctionalized polymer having a molar mass $M_w$ below 1 000 000 g/mol, and the at least one nonfunctionalized or monofunctionalized polymer exhibiting a softening temperature below +200° C.

32. The pressure-sensitive adhesive of claim 30 wherein at least one of its constituent components optionally comprises tackifier resins, plasticizers, rheological additives, catalysts, stabilizers, compatibilizers, coupling reagents, antioxidants, aging inhibitors, light stabilizers, flame retardants, pigments, dyes, fillers and/or expandants.

33. The pressure-sensitive adhesive of claim 30, wherein in the fully reacted state the pressure-sensitive adhesive comprises at least one phase which has a softening temperature between −125° C. and +50° C.

34. The pressure-sensitive adhesive of claim 30, wherein in the fully reacted state the pressure-sensitive adhesive has a plateau modulus $G_N^0$ at 1 rad/s between 1 kPa and 1000 kPa.

35. The pressure-sensitive adhesive of claim 30, wherein the pressure-sensitive adhesive is solventlessly coatable.

36. Self-adhesive products comprising a pressure-sensitive adhesive of claim 30.

37. The process of claim 8, wherein said zero-shear viscosity in the melt at +60° C. is below 1 kPa s.

38. The process of claim 37, wherein said zero-shear viscosity in the melt at +60° C. is below 0.1 kPa s.

39. The process of claim 11, wherein the type of functionalization of at least one first kind of the reactive constituents employed in the intermixed at least two components is such that, with at least one further functionalization type of at least one second kind of reactive constituents, spontaneously or by mediation of activating catalysts, coupling agents or initiators and/or by influence of temperature and/or actinic radiation, a chemical reaction takes place which leads to covalent coupling between the at least one first kind and the at least one second kind of reactive constituents.

40. The process of claim 11, wherein the type of functionalization of at least one first kind of the reactive constituents employed in the intermixed at least two components is such that, with at least one further functionalization type of at least one second kind of reactive constituents, spontaneously or by mediation of catalysts, coupling agents or initiators and/or by influence of temperature and/or actinic radiation, one or more hydrogen bonds are formed which leads to coupling between the at least one first kind and the at least one second kind of reactive constituents.

* * * * *